US010480260B2

(12) United States Patent
Brown et al.

(10) Patent No.: US 10,480,260 B2
(45) Date of Patent: Nov. 19, 2019

(54) ISOLATOR

(71) Applicant: LORD Corporation, Cary, NC (US)

(72) Inventors: Michael R. Brown, Union City, PA (US); Samuel Caraballo, Erie, PA (US); Adam J. Keithly, Conroe, TX (US); Gregg Cune, Conroe, TX (US); Jonathan M. Owens, Chapel Hill, NC (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 15/737,627

(22) PCT Filed: Jun. 30, 2016

(86) PCT No.: PCT/US2016/040453
§ 371 (c)(1),
(2) Date: Dec. 18, 2017

(87) PCT Pub. No.: WO2017/004399
PCT Pub. Date: Jan. 5, 2017

(65) Prior Publication Data
US 2018/0155992 A1    Jun. 7, 2018

Related U.S. Application Data

(60) Provisional application No. 62/186,601, filed on Jun. 30, 2015.

(51) Int. Cl.
*E21B 17/07* (2006.01)
*E21B 17/00* (2006.01)
(Continued)

(52) U.S. Cl.
CPC ............ *E21B 17/07* (2013.01); *E21B 17/003* (2013.01); *E21B 47/011* (2013.01); *F16F 13/06* (2013.01)

(58) Field of Classification Search
CPC ... E21B 17/07; F16F 7/087; F16F 7/12; F16F 15/02; F16F 15/022; F16F 15/04;
(Continued)

(56) References Cited

U.S. PATENT DOCUMENTS 1,785,559 A  *  12/1930  Ponti ....................... E21B 17/07
                                                              175/321
3,947,008 A  *   3/1976  Mullins ................... E21B 17/07
                                                              267/137
(Continued)

FOREIGN PATENT DOCUMENTS

CA      2928134 A1  *  5/2015  ............. E21B 17/07
CA      2972829 A1  * 10/2016  ............. E21B 4/14
(Continued)

*Primary Examiner* — Jennifer H Gay

(57) ABSTRACT

An isolator (200) has an outer housing (224) comprising an outer housing bore (234), an inner member (240) received coaxially within the outer housing (224), a precompressed compression compliance component (CCC) (230) disposed between the outer housing (224) and the inner member (240), the CCC (230) being configured to bias the inner member (240) in an axial direction, and a precompressed rebound compliance component (RCC) (232) disposed between the outer housing (224) and the inner member (240), the RCC (232) being configured to bias the inner member (240) in an opposite axial direction.

22 Claims, 16 Drawing Sheets

(51) Int. Cl.
  *E21B 47/01* (2012.01)
  *F16F 13/06* (2006.01)

(58) Field of Classification Search
  CPC ...... F16F 13/14; F16F 13/149; F16F 2232/08; F16F 2236/04; F16F 2236/045
  See application file for complete search history.

(56) References Cited

U.S. PATENT DOCUMENTS

| | | | | |
|---|---|---|---|---|
| 4,139,994 | A * | 2/1979 | Alther | E21B 17/07 175/321 |
| 4,434,863 | A * | 3/1984 | Garrett | E21B 4/003 175/297 |
| 4,552,230 | A * | 11/1985 | Anderson | E21B 17/07 175/321 |
| 4,779,852 | A * | 10/1988 | Wassell | E21B 47/011 166/319 |
| 5,083,623 | A * | 1/1992 | Barrington | E21B 17/07 166/242.7 |
| 5,188,191 | A * | 2/1993 | Tomek | E21B 17/07 175/321 |
| 5,232,060 | A * | 8/1993 | Evans | E21B 31/113 166/178 |
| 5,868,384 | A * | 2/1999 | Anderson | F16F 1/3732 267/140 |
| 6,412,614 | B1 * | 7/2002 | Lagrange | E21B 17/07 175/293 |
| 2006/0243489 | A1 * | 11/2006 | Wassell | E21B 17/073 175/57 |
| 2010/0132939 | A1 * | 6/2010 | Rodgers | E21B 17/07 166/244.1 |
| 2010/0181111 | A1 * | 7/2010 | Bowar | E21B 17/07 175/56 |
| 2011/0169655 | A1 * | 7/2011 | Close | E21B 47/18 340/853.6 |
| 2012/0273201 | A1 * | 11/2012 | Glenn | E21B 17/07 166/297 |
| 2013/0168092 | A1 * | 7/2013 | Evans | E21B 31/107 166/301 |
| 2014/0055278 | A1 | 2/2014 | Chau et al. | |
| 2014/0262513 | A1 | 9/2014 | Chau et al. | |
| 2015/0159719 | A1 * | 6/2015 | Russell | E21B 17/07 267/141 |
| 2016/0002985 | A1 * | 1/2016 | Baudoin | E21B 43/1195 175/56 |
| 2017/0106927 | A1 * | 4/2017 | McAndrews | B62J 1/08 |
| 2017/0268593 | A1 * | 9/2017 | Kim | F16F 9/19 |
| 2018/0155992 | A1 * | 6/2018 | Brown | E21B 17/003 |

FOREIGN PATENT DOCUMENTS

| | | | | |
|---|---|---|---|---|
| WO | 2014/179587 | | 11/2014 | |
| WO | WO-2016099560 A1 * | | 6/2016 | ............ E21B 43/10 |

\* cited by examiner

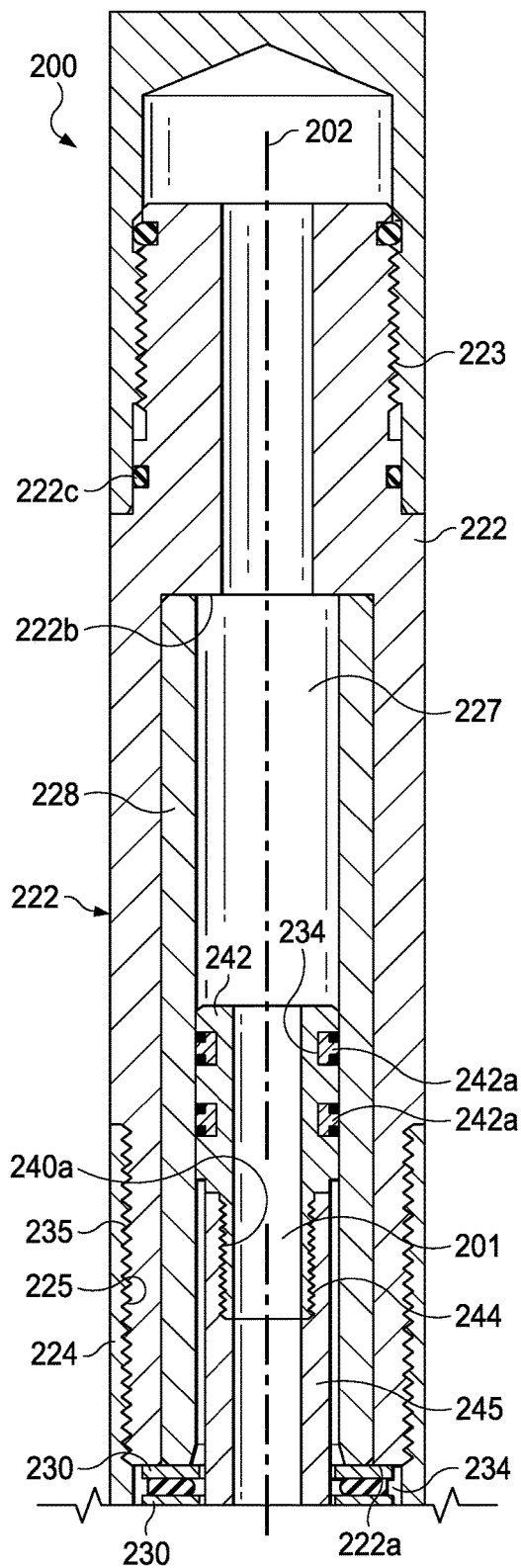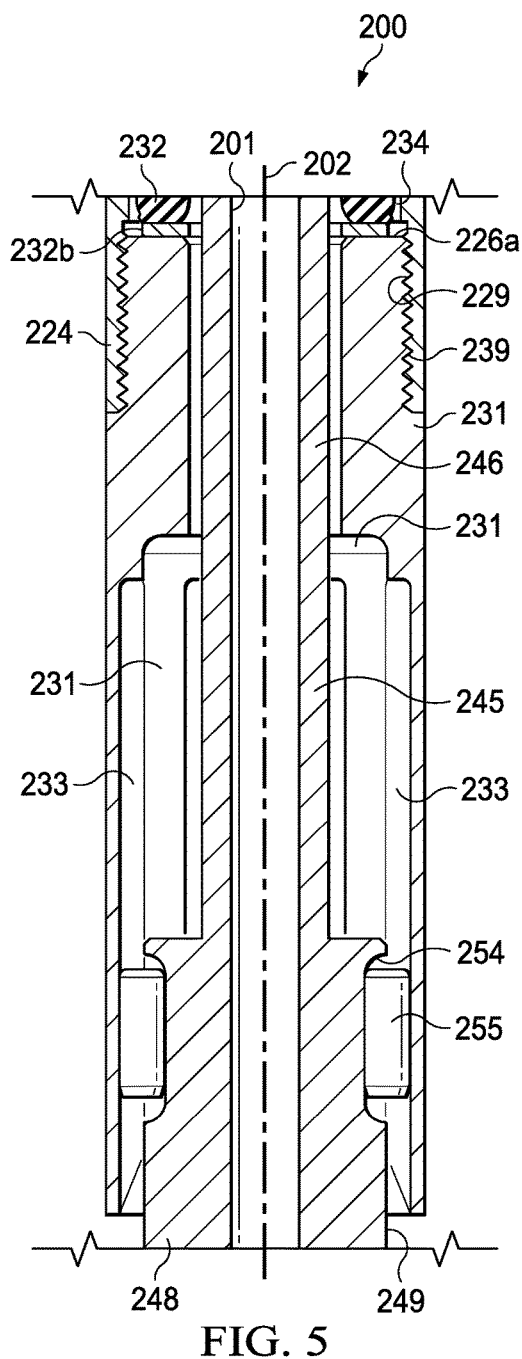
FIG. 4
FIG. 5

ISOLATOR

CROSS-REFERENCE TO RELATED APPLICATIONS

The present application claims priority to U.S. Provisional Patent Application Ser. No. 62/186,601, filed on Jun. 30, 2015 by Brown, et al., entitled "ISOLATOR," the disclosure of which is incorporated herein by reference in its entirety.

FIELD OF INVENTION

The subject matter disclosed herein relates to the design and operation of vibration isolation systems for environments subject to shocks and vibrations, such as downhole operations.

BACKGROUND

In some hydrocarbon recovery systems and/or downhole systems, electronics and/or other sensitive hardware may be included in a drill string. In some cases, a drill string may be exposed to both repetitive vibrations including a relatively consistent frequency and to vibratory shocks that may not be repetitive. Each of the repetitive vibrations and shock vibrations may damage and/or otherwise interfere with the operation of the electronics, such as, but not limited to, measurement while drilling (MWD) devices and/or logging while drilling (LWD) devices, and/or any other vibration-sensitive device of a drill string. Some electronic devices are packaged in vibration resistant housings that are not capable of protecting the electronic devices against both the repetitive and shock vibrations. Active vibration isolation systems can isolate the electronics from harmful vibration but at added expense.

SUMMARY

In one aspect, an isolator is provided. The isolator comprises an outer housing, an inner member, a precompressed compression compliance component (CCC) and a precompressed rebound compliance component (RCC). The outer housing comprises an outer housing bore. The inner member is received coaxially within the outer housing. The CCC is disposed between the outer housing and the inner member, the CCC being configured to bias the inner member in an axial direction. The RCC is disposed between the outer housing and the inner member, the RCC being configured to bias the inner member in an opposite axial direction.

In another aspect, a hydrocarbon recovery system (HRS) is provided. The HRS comprises an isolated mass, and excitation source and an isolator. The isolator is disposed between the isolated mass and the excitation source. The isolator comprises an outer housing, an inner member, a precompressed compression compliance component (CCC) and a precompressed rebound compliance component (RCC). The outer housing comprises an outer housing bore. The inner member is received coaxially within the outer housing. The CCC is disposed between the outer housing and the inner member, the CCC being configured to bias the inner member in an axial direction. The RCC is disposed between the outer housing and the inner member, the RCC being configured to bias the inner member in an opposite axial direction.

BRIEF DESCRIPTION OF THE DRAWINGS

For a more complete understanding of the present disclosure and the advantages thereof, reference is now made to the following brief description, taken in connection with the accompanying drawings and detailed description.

FIG. 4 is a partial orthogonal cross-sectional view of the isolator of FIG. 2 showing an upstream endcap of the isolator of FIG. 2.

FIG. 5 is a partial orthogonal cross-sectional view of the isolator of FIG. 2 showing a downstream endcap of the isolator of FIG. 2.

DETAILED DESCRIPTION

Figure 1:
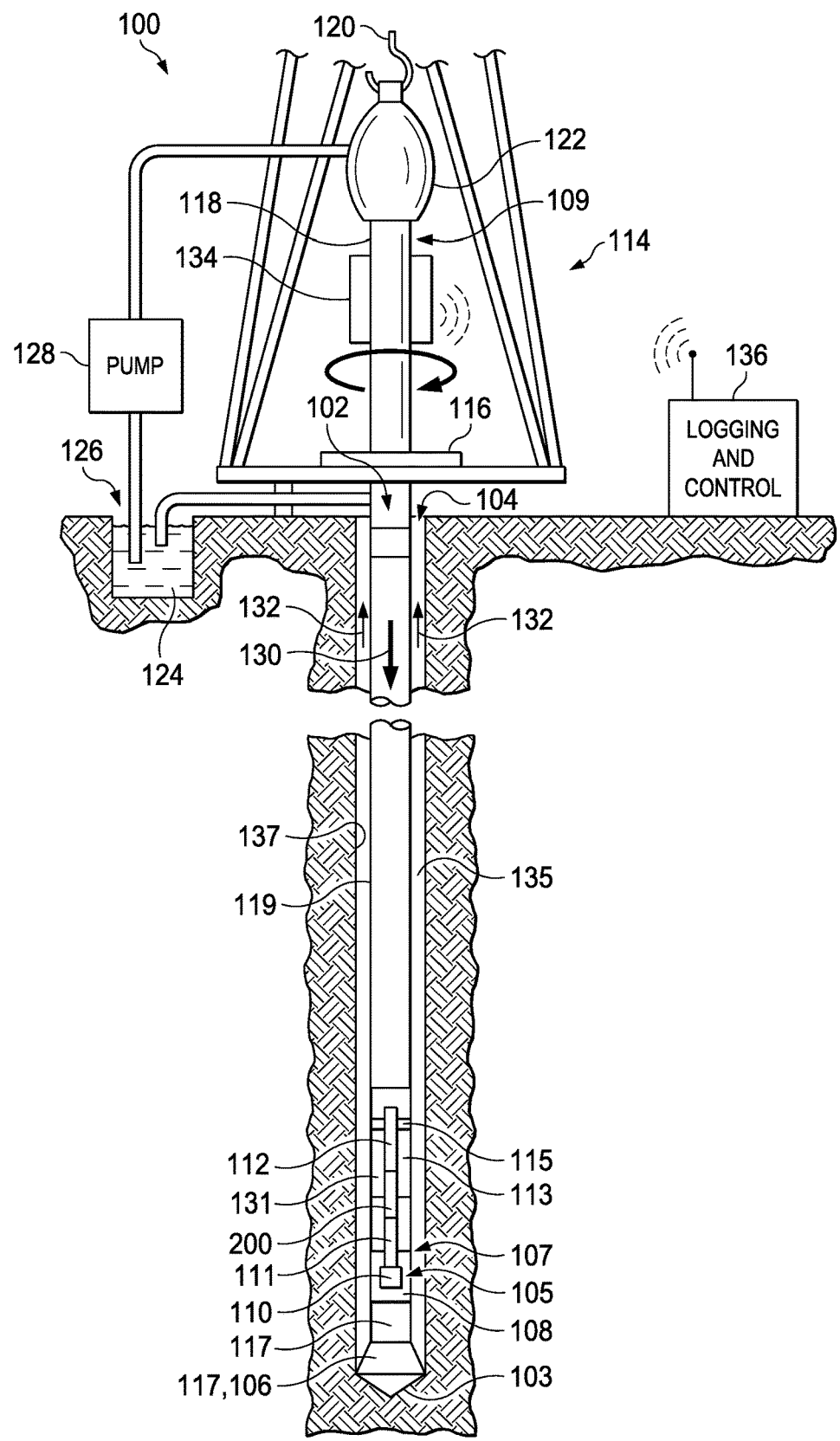
FIG. 1 is a schematic view of a hydrocarbon recovery system according to an embodiment of the disclosure.

Referring now to FIG. 1, a hydrocarbon recovery system (HRS) 100 is shown. Although the HRS 100 is onshore, in alternative embodiments, the HRS 100 can be offshore. The HRS 100 generally includes a drill string 102 suspended within a borehole 104. The borehole 104 extends substantially vertically away from the earth's surface over a vertical wellbore portion, or in some embodiments, deviates at any suitable angle from the earth's surface over a deviated or horizontal wellbore portion. In alternative operating environments, portions or substantially all of a borehole 104 may be vertical, deviated, horizontal, curved, and/or combinations thereof.

The drill string 102 includes a drill bit 106 at a lower end 103 of the drill string 102 and a universal bottom hole orienting (UBHO) sub 108 connected above the drill bit 106. The UBHO sub 108 includes a mule shoe 110 configured to connect with a stinger (not shown) or pulser helix 111 on a top side 105 of the mule shoe 110. The HRS 100 further includes an electronics casing 113 incorporated within the drill string 102 above the UBHO sub 108, for example, connected to a top side 107 of the UBHO sub 108. The electronics casing 113 may at least partially house the stinger or pulser helix 111, an isolator 200 connected above the stinger or pulser helix 111, an isolated mass 112 connected above the isolator 200, and/or centralizers 115. The isolated mass 112 can include electronic components. The HRS 100 includes a platform and derrick assembly 114 positioned over the borehole 104 at the surface. The platform and derrick assembly 114 includes a rotary table 116, which engages a kelly 118 at an upper end 109 of the drill string 102 to impart rotation to the drill string 102. The drill string 102 is suspended from a hook 120 that is attached to a traveling block (not shown). The drill string 102 is positioned through the kelly 118 and the rotary swivel 122 which permits rotation of the drill string 102 relative to the hook 120. Additionally, or alternatively, a top drive system (not shown) may be used to impart rotation to the drill string 102.

The HRS 100 further includes drilling fluid 124 which may include a water-based mud, an oil-based mud, a gaseous drilling fluid, water, brine, gas and/or any other suitable fluid for maintaining bore pressure and/or removing cuttings from the area surrounding the drill bit 106. Some volume of drilling fluid 124 may be stored in a pit 126 and a pump 128 may deliver the drilling fluid 124 to the interior of the drill string 102 via a port (not shown) in the rotary swivel 122, causing the drilling fluid 124 to flow downwardly through the drill string 102 as indicated by directional arrow 130. The drilling fluid 124 may pass through an annular space 131 between the electronics casing 113 and each of the pulser helix 111, the isolator 200, and/or the isolated mass 112 prior to exiting the UBHO sub 108. After exiting the UBHO sub 108, the drilling fluid 124 may exit the drill string 102 via ports (not shown) in the drill bit 106 and be circulated upwardly through an annulus region 135 between the outside of the drill string 102 and a wall 137 of the borehole 104 as indicated by directional arrows 132. The drilling fluid 124 may lubricate the drill bit 106, carry cuttings from the formation up to the surface as it is returned to the pit 126 for recirculation, and create a mudcake layer (e.g., filter cake) on the walls 137 of the borehole 104. The drill bit 106 may generate vibratory forces and/or shock forces in response to encountering hard formations. Although the drill bit 106 itself can be considered an excitation source 117 that provides some vibratory excitation to the drill string 102, the HRS 100 may further include an excitation source 117 such as an axial excitation tool 119 and/or any other vibratory device configured to agitate, vibrate, shake, and/or otherwise change a position of a lower end 103 of the drill string 102 and/or any other component of the drill string 102 relative to the wall 137 of the borehole 104. In some cases, operation of an axial excitation tool 119 may generate oscillatory movement of selected portions of the drill string 102 so that the drill string 102 is less likely to become hung or otherwise prevented from advancement into and/or out of the borehole 104. In some embodiments, low frequency oscillations of one or more excitation sources 117 may have values of about 5 Hz to about 100 Hz. The term excitation source 117 is intended to refer to any source of the above-described vibratory or shock forces, including, but not limited to, a drill bit 106, an axial excitation tool 119 that is purpose built to generate such forces, and/or combinations thereof.

In the embodiment of FIG. 1, the HRS 100 further includes a communications relay 134 and a logging and control processor 136. The communications relay 134 may receive information and/or data from sensors, transmitters, receivers, and/or other communicating devices that may form a portion of the isolated mass 112. In an embodiment, the information is received by the communications relay 134 via a wired communication path through the drill string 102. In an alternative embodiment, the information is received by the communications relay 134 via a wireless communication path. In an embodiment, the communications relay 134 transmits the received information and/or data to the logging and control processor 136. Additionally, or alternatively, the communications relay 134 receives data and/or information from the logging and control processor 136. In an embodiment, upon receiving the data and/or information, the communications relay 134 forwards the data and/or information to the appropriate sensor(s), transmitter(s), and/or receiver(s) and/or other communicating devices. The isolated mass 112 may include measuring while drilling (MWD) devices and/or logging while drilling (LWD) devices and the isolated mass 112 may include multiple tools or subs and/or a single tool and/or sub. In the embodiment of FIG. 1, the drill string 102 includes a plurality of tubing sections; that is, the drill string 102 is a jointed or segmented string. Alternative embodiments of drill string 102 can include any other suitable conveyance type, for example, coiled tubing, wireline, and/or wired drill pipe. The HRSs 100 that implement at least one embodiment of an isolator 200 and/or isolator 300 disclosed herein may be referred to as downhole systems for isolating a component, (i.e., for isolating axial forces to an isolated mass 112).

Figure 2:
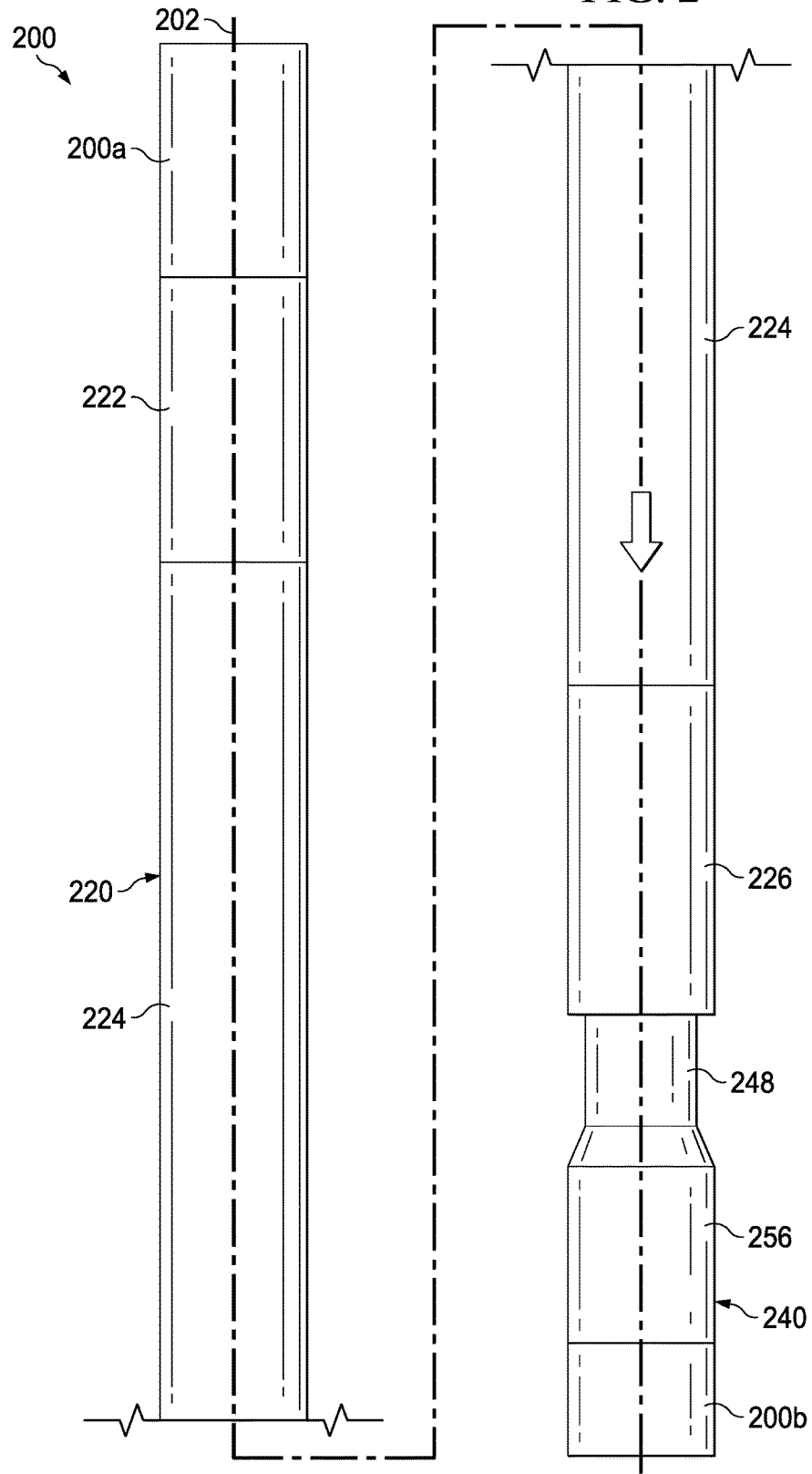
FIG. 2 is an orthogonal side view of an isolator of the hydrocarbon recovery system of FIG. 1 according to an embodiment of the disclosure.
Figure 3:
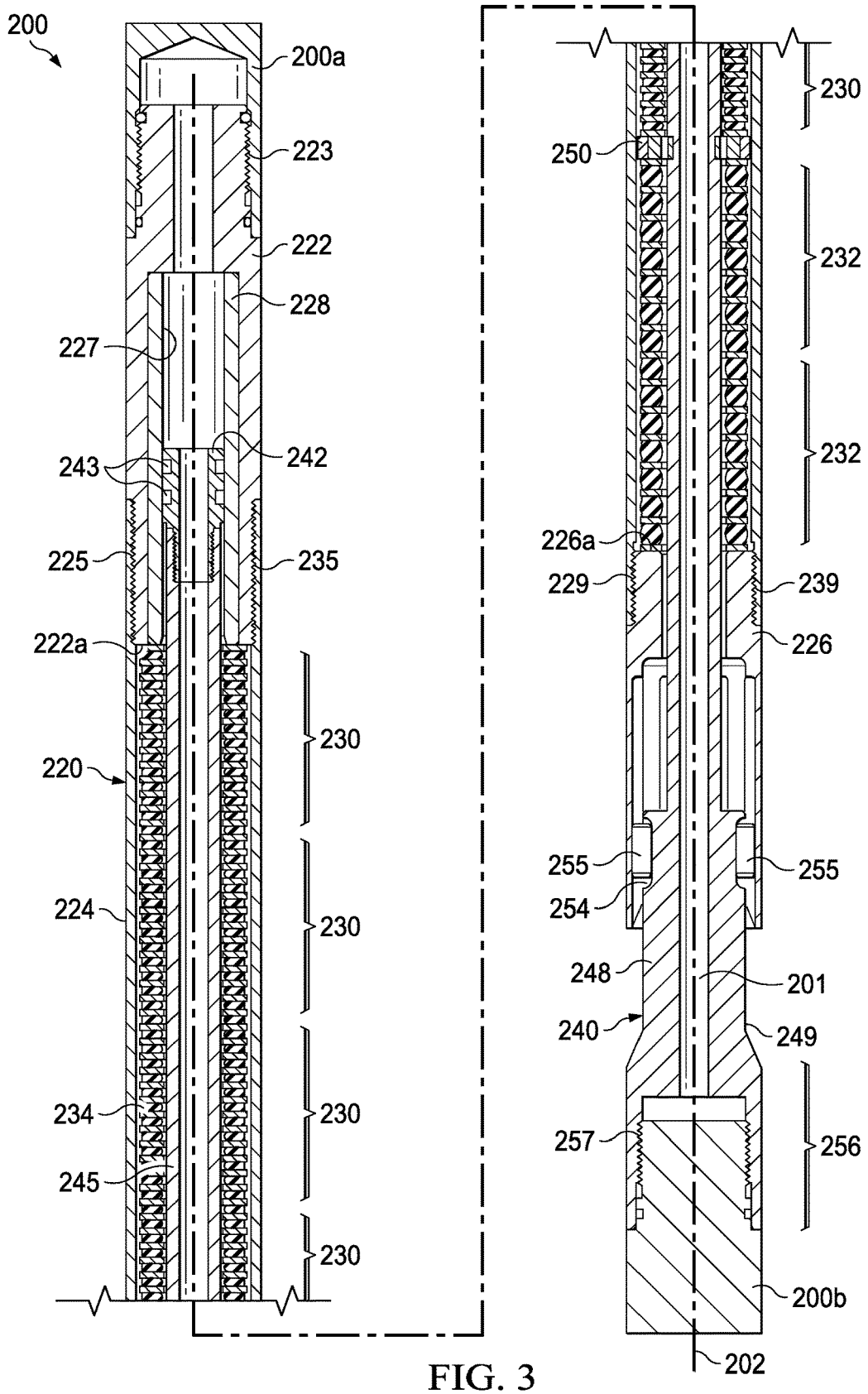
FIG. 3 is an orthogonal cross-sectional view of the isolator of FIG. 2.

Referring now to FIGS. 2 and 3, the isolator 200 generally defines a longitudinally-extending flowbore 201 having a central axis 202 with respect to which many of the components of the isolator 200 are substantially coaxially aligned. The isolator 200 generally includes an outer housing 224, an upstream endcap 222 connected to an upstream end of the outer housing 224, and a downstream endcap 226 connected to a downstream end of the outer housing 224. The isolator 200 further includes an inner member 240 that is received through the downstream endcap 226 and into the outer housing 224 and the upstream endcap 222. The inner member 240 is longitudinally movable relative to each of the downstream endcap 226, outer housing 224, and upstream endcap 222. As described below, the isolator 200 further includes a plurality of compression compliance components (CCCs) 230, a plurality of rebound compliance components (RCCs) 232, and a piston 242 that each contribute to the vibration isolation and shock attenuation capabilities of the isolator 200. Although FIGS. 2-4 show thread protectors 200a, 200b coupled to upper interface 223 of the upstream endcap 222 and lower interface 257 of the inner member 240, respectively, the thread protectors 200a, 200b should be removed during assembly and disposition of the isolator 200 between an isolated mass 112 and an excitation source 117.

Referring to FIG. 4, the upper interface 223 is located at an upper end of the upstream endcap 222. The upper interface 223 is configured for connection to complementary threads of an isolated mass 112. In alternative embodiments, the upstream endcap 222 can include an internally threaded interface or a quick-connect type configuration for use in connecting to an isolated mass 112. The upstream endcap 222 can incorporate use of an O-ring 222c and/or or other suitable seal. The upstream endcap 222 includes an outer housing interface 225 at the lower end of upstream endcap 222 and the outer housing interface 225. The outer housing interface 225 is configured for connection to an upstream endcap interface 235 of the outer housing 224. The upstream endcap 222 is configured to receive a sleeve 228 and the sleeve 228 is sized and configured to receive a piston 242 carried by the inner member 240. The piston 242 is configured to slide within a sleeve bore 227 of the sleeve 228. The sleeve 228 is constructed of ceramic material, but in alternative embodiments, the sleeve 228 can include hardened steel, titanium, carbide, cobalt steel, and/or any other suitable material. In some embodiments, the sleeve 228 can be treated and/or coated with a suitable coating such as nickel cobalt, a ceramic coating, gas nitriding, boriding, or the like.

Referring to FIG. 5, the downstream endcap 226 includes an outer housing interface 229 at the upper end of the downstream endcap 226. The outer housing interface 229 is configured for connection to complementary threads of the downstream endcap interface 239 of the outer housing 224. The downstream endcap 226 includes a downstream endcap bore 231 configured to receive a portion of the inner member 240. The downstream endcap 226 further includes a plurality of axially-extending pin channels 233 that extend generally parallel to the central axis 202. Each pin channel 233 is configured to receive a dowel pin 255. The pin channels 233 comprise a substantially U-shaped profile configured to complement at least a portion of the dowel pins 255.

Figure 12:
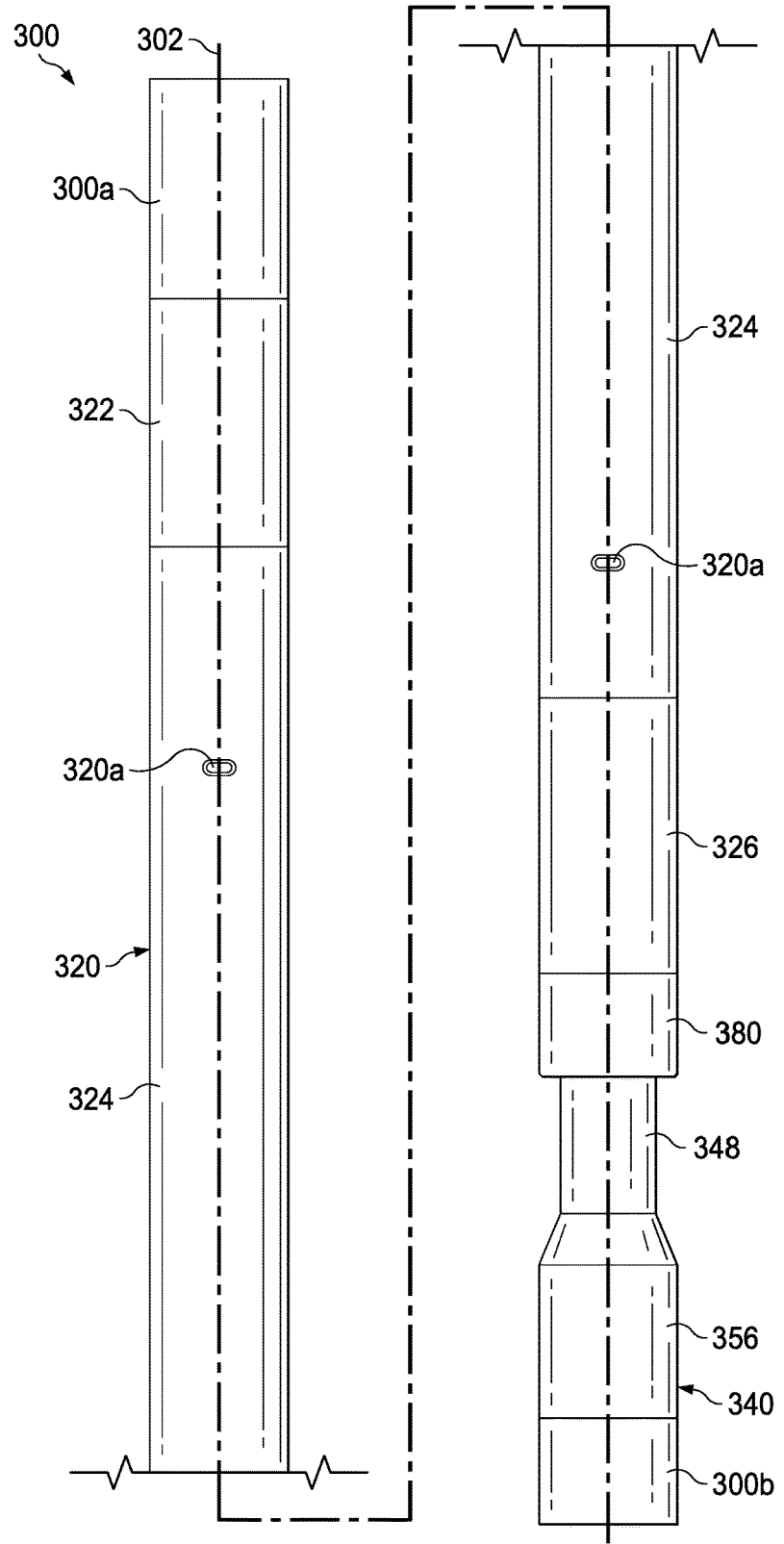
FIG. 12 is an orthogonal side view of an alternative embodiment of an isolator of hydrocarbon recovery system.

Referring to FIGS. 2 and 12, the outer housing 224 includes one or more fluid apertures generally providing a route of fluid communication between an external and an internal surface thereof. Additionally, the fluid apertures may be fitted with one or more pressure or flow-rate altering inserts, for example, a flow metering device or nozzle configured to alter rate and/or pressure at which fluid may move between the internal and external surfaces of the outer housing 224. Alternatively, the fluid apertures may be sized by precision drilling or cutting methodologies, to yield an orifice having a particular, predetermined size or character. In some embodiments, the fluid apertures may be referred to as fluid compensation ports (not shown in FIG. 2), such as pressure compensation port 320a of isolator 300 discussed below.

Referring again to FIG. 3, when the outer housing 224 is connected between the upstream endcap 222 and the downstream endcap 226, an outer housing bore 234 is defined that extends through the outer housing 224 between a lower shoulder 222a of the upstream endcap 222 and an upper shoulder 226a of the downstream endcap 226. The CCCs 230 and RCCs 232 are disposed within the outer housing bore 234. The inner member 240 generally carries the piston 242 at an upper end of the inner member 240. The inner member 240 generally includes an alignment portion 248 connected between an upper tube 245 and an adapter portion 256.

Figure 6:
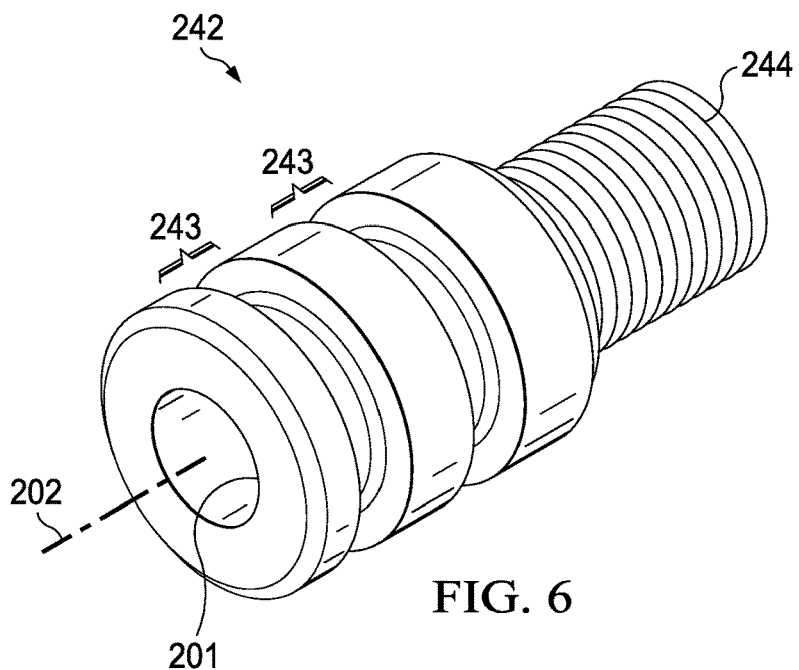
FIG. 6 is an oblique view of a piston of the isolator of FIG. 2.

Referring to FIG. 6, the piston 242 is generally tubular and configured to be received within a sleeve bore 227 defined by the sleeve 228. The piston 242 includes two grooves 243 extending circumferentially about the outer surface of the piston 242. The grooves 243 are sized and configured to receive seals 242a. In this embodiment, the seals 242a are T-seals. In alternative embodiments, seals 242a may include O-rings, gaskets, and/or any other suitable seal shape and/or material. The piston 242 further includes an upper tube interface 244 at the lower end of the piston 242. The upper tube interface 244 includes threads complementary to threads of a piston interface 240a of the upper tube 245. The longitudinally extending flowbore 201 extends through the piston 242 and upper tube 245 when coupled together. In an alternative embodiment, the piston 242 may be welded or integrally formed with the upper tube 245. The piston 242 can reciprocate along central axis 202 within the sleeve bore 227 until the piston 242 reaches a hard end-stop 222b formed by upstream endcap 222. The CCCs 230 and RCCs 232 may be configured to withstand a shock or other axial input (e.g., a shock input, vibration, and/or other axial excitation force) and retain a separation between both the inner member 240 and a hard end-stop 222b. The CCC 230 and RCC 232 are further configured to withstand a shock input and retain a separation between both the CCCs 230 and the RCCs 232 and a hard end-stop 222b.

Figure 7:
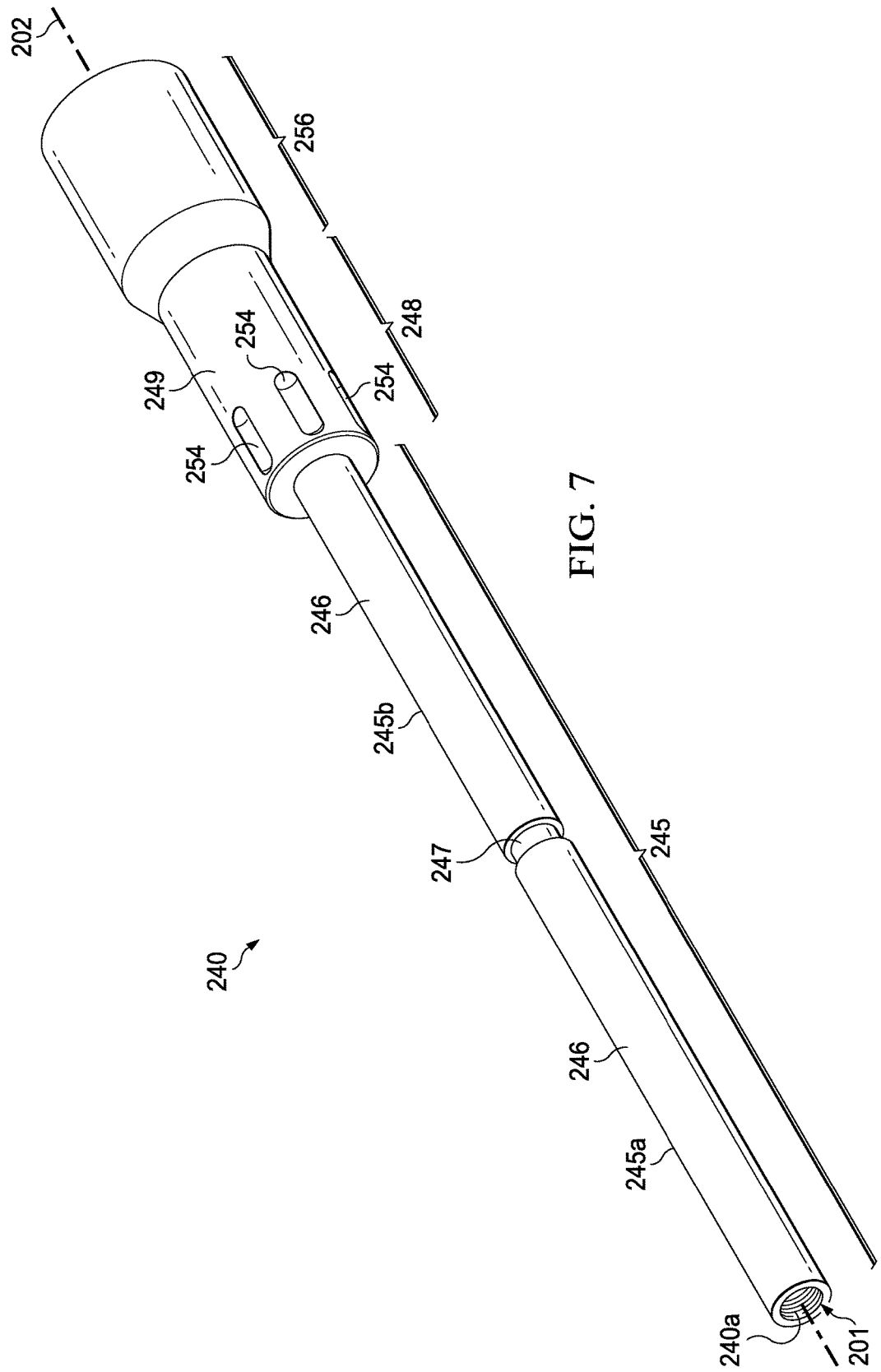
FIG. 7 is an oblique view of an inner member of the isolator of FIG. 2.

Referring to FIG. 7, the upper tube 245 generally includes an upper tube outer surface 246. The upper tube outer surface 246 is sized and configured to fit within an inner CCC bore 237 of the CCCs 230 and an inner RCC bore 238 of the RCCs 232. The upper tube 245 can include an upper section 245a that is distal from the alignment portion 248 and a lower section 245b that is adjacent to the alignment portion 248. In this embodiment, the outer diameter of upper section 245a is the about the same as the outer diameter of the lower section 245b and the upper tube 245 has a generally consistent inner diameter that defines a portion of the flowbore 201. The upper tube 245 includes a drive channel 247 extending circumferentially around the upper tube 245. The drive channel 247 is sized and configured to receive a drive unit 250 that extends radially beyond the drive channel 247 and allows for the transfer of axial forces between the upper tube 245 and the CCCs 230 and RCCs 232. The drive unit 250 is generally disposed between the upper section 245a and the lower section 245b.

Figure 8:
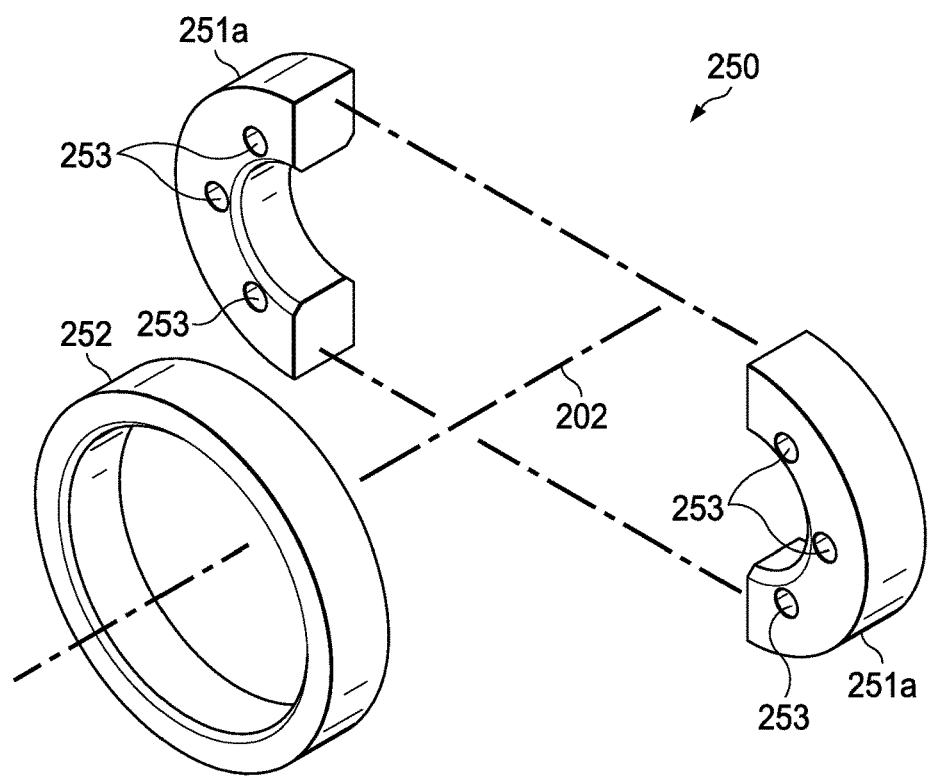
FIG. 8 is an exploded oblique view of a drive unit of the isolator of FIG. 2.
Figure 9:
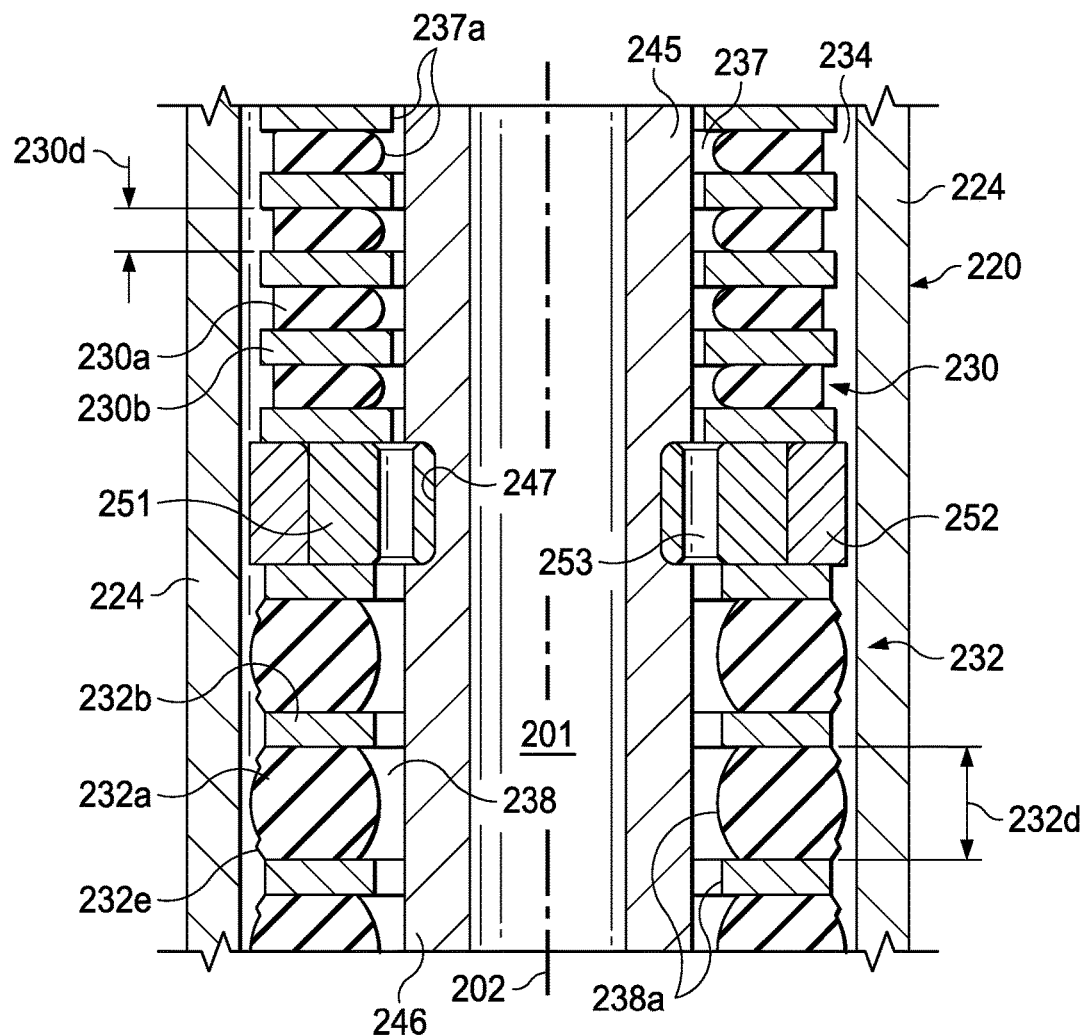
FIG. 9 is a partial orthogonal cross-sectional view the isolator of FIG. 2 showing the drive unit of FIG. 8.

Referring to FIGS. 8 and 9, the drive unit 250 includes both a split drive washer 251 and a drive collar 252. The split drive washer 251 is generally a cylindrical structure sized and configured to fit within the drive channel 247. The split drive washer 251 includes two sub-components 251a, each of which accounts for a circumferential portion (less than or equal to one-half) of the split drive washer 251. The drive collar 252 is generally a ring-like structure sized and configured to fit around the split drive washer 251 when the two sub-components 251a joined together or located relative to each other to collectively form a ring. The drive collar 252 can lock the two sub-components 251a together when the two sub-components 251a of the split drive washer 251 are disposed within the drive channel 247. In an alternative embodiment, a drive unit 250 can include a biased retention ring configured to hold lock the two sub-components 251a in place relative to each other and/or the drive channel 247. The split drive washer 251 includes one or more boreholes 253 extending longitudinally therethrough. The boreholes 253 can provide a route of fluid communication from a lower side of the drive unit 250 to an upper side of the drive unit 250.

Referring back to FIGS. 3, 5, and 7, the alignment portion 248 of the inner member 240 includes an alignment portion outer surface 249. The alignment portion outer surface 249 is sized and configured to slidably fit within the downstream endcap bore 231 of the downstream endcap 226. The alignment portion 248 further includes a plurality of axially-extending pin channels 254 that extend generally parallel to the central axis 202. Each of the pin channels 254 is generally configured to receive at least a portion of a dowel pin 255. Each of the pin channels 254 has a substantially U-shaped profile configured to complement at least a portion of the dowel pins 255. In alternative embodiments, dowel pins 255 may be shaped differently and the pin channels 254 may be shaped to complement the dowel pins 255. The pin channels 254 are disposed to longitudinally overlap and are angularly aligned with the pin channels 233. When the alignment portion 248 is slidably fitted within the downstream endcap 226, each dowel pin 255 is received within a pin channel 254 and an associated aligned pin channel 233. While the inner member 240 can move longitudinally relative to the downstream endcap 226, the captured dowel pins 255 prevent relative angular rotation between the inner member 240 and the downstream endcap 226. The adapter portion 256 includes a lower interface 257 at a lower end of the adapter portion 256. The lower interface 257 is configured for connection to the pulser helix 111. Alternate embodiments of anti-rotation components may include the use of at least one polygon spline and/or involute tooth spline circumferentially disposed about the inner member 240 to engage a complementary channel and the of the downstream endcap 226.

Figure 10:
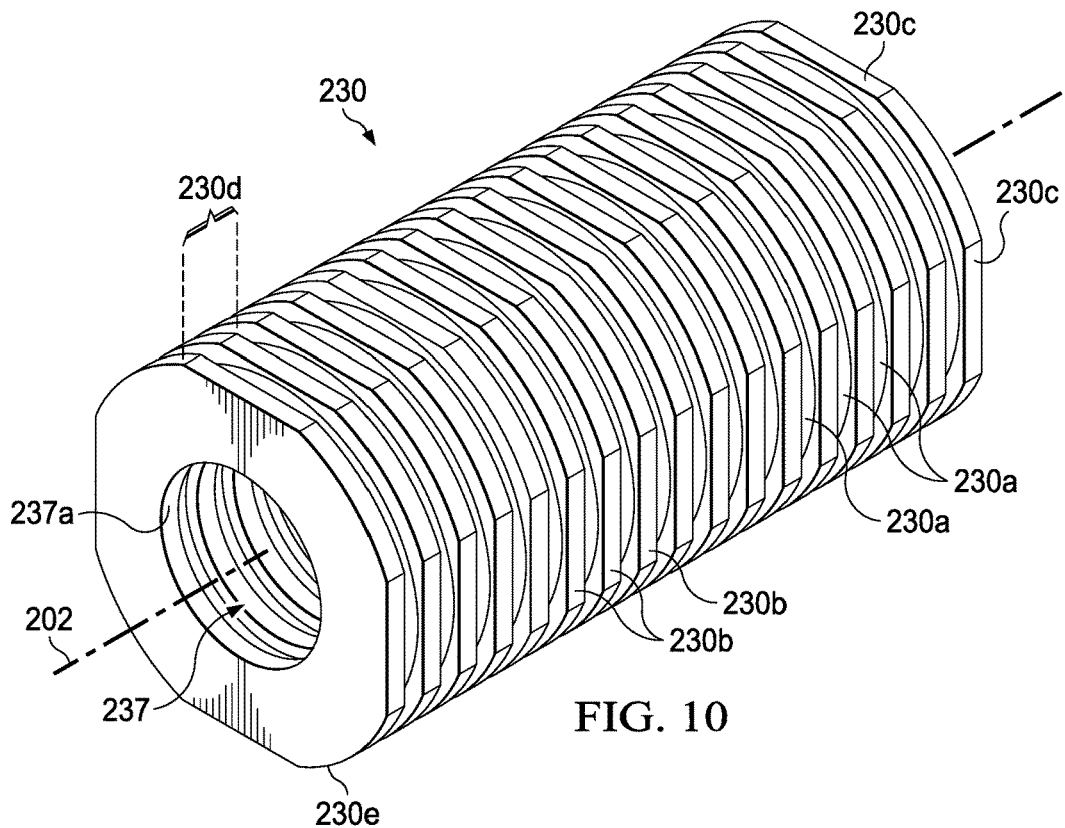
FIG. 10 is an oblique view of a compression compliance component (CCC) of the isolator of FIG. 2.

Referring to FIG. 10, a CCC 230 is shown. The CCC 230 is generally configured such that when the isolator 200 experiences a force or stress sufficient to cause the isolator 200 to be longitudinally compressed and longitudinally shortened, the compression of the CCC 230 is increased. The CCC 230 includes a plurality of elastomeric elements 230*a* and spacer elements 230*b*. Each of the elastomeric elements 230*a* is generally tubular in shape and includes a concentric inner CCC bore 237. Each elastomeric element 230*a* is formed from a suitable elastomeric material, for example, rubber, nitrile, or combinations thereof. The elastomeric elements 230*a* can be sized to have a desired longitudinal dimension with respect to the central axis 202 to provide a desired compression profile. The CCC 230 further includes spacer elements 230*b* that are bonded or otherwise disposed between elastomeric elements 230*a*. The elastomeric elements 230*a* may be elastomers bonded using a post-vulcanization process such that the inner CCC bore surface 237*a* of the inner CCC bore 237 is not continuous in dimension. In other words, the inner CCC bore 237 can be formed of the curved elastomeric elements 230*a* inner profiles and the relatively flat inner profiles of the spacer elements 230*b*. The inner CCC bore 237 has an inner diameter that is larger than the outer diameter of the upper tube 245 such that a route of fluid passage is provided in the inner CCC bore 237 between upper tube outer surface 246 and inner CCC bore surface 237*a* when bulk loading does not occur, as discussed below. In this embodiment, each CCC 230 includes fifteen elastomeric elements 230*a* and sixteen spacer elements 230*b*. Each of the CCCs 230 exhibit a non-linear axial stiffness. The axial stiffness of the CCC 230 is different than the axial stiffness of the RCC 232 in part because of the differing axial biases provided by the elastomeric elements 230*a* and the elastomeric elements 232*a*. In alternative embodiments, a CCC 230 can include any other suitable number of elastomeric elements 230*a* (each having a desired axial dimension and stiffness) and spacer elements 230*b*. In alternative embodiments, the CCC 230 may include a metal spring, a wire-mesh material exhibiting suitable spring-like characteristics, and/or the like to provide an axial bias. The spacer elements 230*b* comprise a generally cylindrical outer profile 230*e* that includes flat segments 230*c*. The flat segments 230*c* provide a route of fluid communication between the CCC 230 and the outer housing 224. In alternative embodiments, more or fewer flat segments 230*c* may be provided. While each CCC 230 of isolator 200 includes the same number of elastomeric elements 230*a*, in alternative embodiments of an isolator 200, CCCs 230 can be provided with different numbers of elastomeric elements 230*a*.

Figure 11:
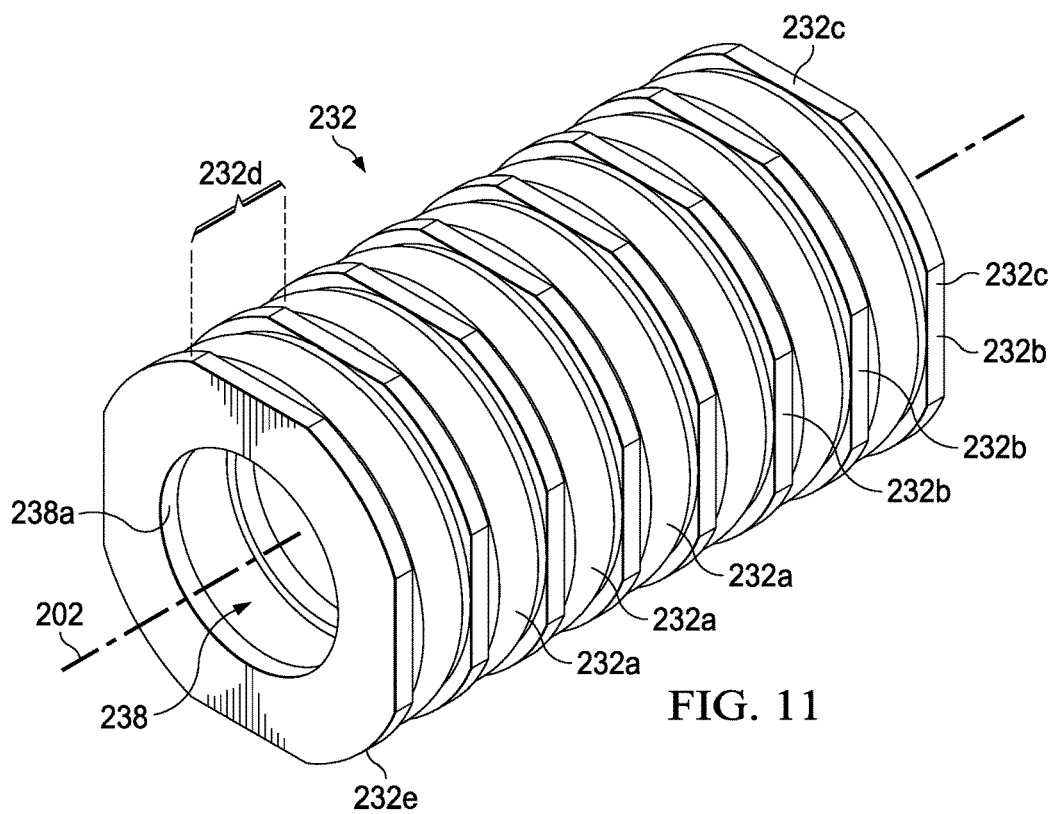
FIG. 11 is an oblique view of a rebound compliance component (RCC) of the isolator of FIG. 2.

Referring to FIG. 11, an RCC 232 is shown. The RCC 232 is generally configured such that when the isolator 200 experiences a force or stress sufficient to cause the isolator 200 to be longitudinally lengthened, the compression of the RCC 232 is increased. The RCC 232 includes a plurality of elastomeric elements 232*a* and spacer elements 232*b*. Each of the elastomeric elements 232*a* is generally tubular in shape and includes a concentric inner RCC bore 238. Each elastomeric element 232*a* is formed from a suitable elastomeric material, for example, rubber, nitrile, or combinations thereof. The elastomeric elements 232*a* can be sized to have a desired longitudinal dimension with respect to the central axis 202 to provide a desired compression profile. The RCC 232 further includes spacer elements 232*b* that are bonded or otherwise disposed between elastomeric elements 232*a*. The elastomeric elements 232*a* may be elastomers bonded using a post-vulcanization process such that the inner RCC bore surface 238*a* of the inner RCC bore 238 is not continuous in dimension. In other words, the inner RCC bore 238 can be formed of the curved elastomeric elements 232*a* inner profiles and the relatively flat inner profiles of the spacer elements 232*b*. The elastomeric elements 232*a* may have an axial stiffness that is less than an axial stiffness of the elastomeric elements 230*a* and may be bonded such that they are pre-compressed between spacer elements 232*b* to form a curved profile that is wider than the curved profile formed by the elastomeric elements 230*a* between spacer elements 230*b*. The inner RCC bore 238 has an inner diameter that is larger than the outer diameter of the upper tube 245 such that a route of fluid passage is provided in the inner RCC bore 238 between upper tube outer surface 246 and inner RCC bore surface 238*a* when bulk loading does not occur, as discussed below. In one embodiment, each RCC 232 includes seven elastomeric elements 232*a* and eight spacer elements 232*b*. The RCC 232 exhibits a non-linear stiffness. In alternative embodiments, an RCC 232 can include any suitable number of elastomeric elements 232*a* (each having a desired axial dimension) and spacer elements 232*b*. In alternative embodiments, the RCC 232 may include a metal spring, a wire-mesh material exhibiting suitable spring-like characteristics, and/or the like to provide different axial biases between the CCC 230 and RCC 232. The spacer elements 232*b* comprise a generally cylindrical outer profile 232*e* that includes flat segments 232*c*. The flat segments 232*c* provide a route of fluid communication between the RCC 232 and the outer housing 224. In alternative embodiments, more or fewer flat segments 232*c* may be provided. While each RCC 232 of isolator 200 includes the same number of elastomeric elements 232*a*, in alternative embodiments of an isolator 200, RCCs 232 can be provided with different numbers of elastomeric elements 232*a*.

The total number of elastomeric elements 230*a* utilized in the isolator 200 can depend on the distance between the drive unit 250 and lower shoulder 222*a*. Similarly, the total number of elastomeric elements 230*a* utilized in the isolator 200 can depend on the desired amount of axial stiffness that the CCC 230 is to provide relative to the axial stiffness that the RCC 232 is to provide while allowing for a natural frequency less than an excitation frequency associated with operation of an excitation source 117. The isolator 200 may be configured such that the number of elastomeric elements 230a between the drive unit 250 and lower shoulder 222a is greater than the number of elastomeric elements 232a between drive unit 250 and upper shoulder 226a. The RCCs 232 are configured to have an axial stiffness that is lower relative to that of the CCCs 230 and will provide a natural frequency less than an anticipated excitation frequency (e.g., 0.7 times less than anticipated excitation frequency) when the isolator 200 is disposed between an isolated mass 112 and an excitation source 117. Similarly, the relative axial disposition of the drive unit 250 within the outer housing 224 (assuming a neutral state) is dependent on the number of CCCs 230 and RCCs 232 disposed on either side of the drive unit 250. While the isolator 200 includes four CCCs 230 and two RCCs 232, any other suitable number of CCCs 230 and RCCs 232 may be employed.

Each of the four CCCs 230 is disposed about an upper section 245a of the upper tube outer surface 246 of the upper tube 245 and longitudinally between the drive unit 250 and the lower shoulder 222a. Also, each of the two RCCs 232 is disposed about a lower section 245b of the upper tube outer surface 246 and longitudinally between the drive unit 250 and the upper shoulder 226a. When the isolator 200 is in a neutral state (e.g., when no outside longitudinal tension and no outside longitudinal compression is applied to the isolator 200), at least one of the four CCCs 230 is at least partially compressed and at least one of the two RCCs 232 is at least partially compressed. The degree to which the one or more of the CCCs 230 and one or more of the RCCs 232 are compressed when the isolator 200 is in the neutral state is adjustable by adjusting the threaded connection between the upstream endcap 222 and the outer housing 224 and/or by adjusting the threaded connection between the outer housing 224 and the downstream endcap 226.

In operation, the isolator 200 is coupled between an isolated mass 112 and an excitation source 117 and the isolator 200 provides a relatively soft (relatively long settling time) spring mass system that operates to isolate the isolated mass 112 from selected frequencies of vibrational perturbations along the central axis 202. The isolator 200 serves to attenuate a shock, damp a vibration, isolate a vibration, and/or combinations thereof. The isolated mass 112 may weigh about 150 pounds. In alternative embodiments, the isolated mass 112 and/or any other components that together include a mass to be isolated by the isolator 200 may weigh any other suitable amount. Examples of an isolated mass 112 include electronic components that may comprise MWD devices and/or LWD devices.

As used herein, the term neutral state refers to a position of the inner member 240 relative to the outer housing 224 where the inner member 240 is displaced in a first direction or second direction along central axis 202 due to an external axial input force. In the neutral state, the isolator 200 is not lengthened or shortened due to any external axial input force. In the neutral state, the isolator 200 is considered to be in dual-compression because each of the CCCs 230 and the RCCs 232 are in pre-compression on either side of the drive unit 250 upon assembly. The isolator 200 can receive perturbing axial input forces (e.g. compressive forces and/or tension forces) from the mule shoe 110 and transfer the forces between the inner member 240 and the upstream endcap 222 via the drive unit 250, the CCCs 230, and/or the RCCs 232. A compression force (e.g., a force effective to compress the isolator 200 longitudinally) is transferred via the adapter portion 256 to the upper tube 245; the upper tube 245 transfers the compressional force to the CCCs 230 via the drive unit 250, thereby causing an increase in the compression of the CCCs 230 and allows a partial precompression relief of the RCCs 232. When isolator 200 is compressed, the inner member 240 is considered to move in a first direction axially along central axis 202. When the isolator 200 is in tension, the inner member 240 is considered to move in a second direction axially along central axis 202. The axial input forces are received from an excitation source 117. A tension force (e.g., a force effective to extend the isolator 200 longitudinally) is transferred via the adapter portion 256 to the upper tube 245; the upper tube 245 transfers the tension force to the RCCs 232 via the drive unit 250, thereby causing an increase in the compression of the RCCs 232 and allows a partial precompression relief of the CCCs 230. The CCC and the RCC are further configured such that under large compressive and tensile motions along the central axis, the CCC and RCC maintain contact throughout the entire isolator. This occurs between the upstream end cap and CCC, CCC and drive washer, drive washer and RCC, and RCC and downstream end cap.

As shown in FIGS. 9-11, the CCC 230 has a plurality of compression compliance sections 230d, each section comprising an elastomeric element 230a compressed (i.e., considered to be pre-compressed in the neutral state) between two spacer elements 230b, thereby providing axial bias and a first axial stiffness over a first defined distance between the two spacer elements 230b. Similarly, the RCC 232 has a plurality of rebound compliance sections 232d each section comprising an elastomeric element 232a compressed (i.e., pre-compressed in neutral state) between two spacer elements 232b, thereby providing a second axial bias and a second axial stiffness over a second defined distance. The second defined distance between spacer elements 232b of rebound compliance section 232d is greater than the first defined distance between spacer elements 230b of compression compliance section 230d, thereby contributing to the CCC 230 having a greater axial stiffness than the RCC 232. When the inner member 240 receives a compressive force, the first defined distance of the compression compliance sections 230d decreases due to the elastomeric elements 230a radially expanding in response to further compression, and the second defined distance of the rebound compliance sections 232d increases due to the elastomeric elements 232a radially contracting in response to partial precompression release of the RCCs 232. Conversely, when the inner member 240 receives a tension force, the second defined distance of the rebound compliance sections 232d decreases due to the elastomeric elements 232a radially expanding in response to being further compressed, and the first defined distance of the compression compliance sections 230d increases due to the elastomeric elements 230a radially contracting in response to partial precompression release of the CCCs 230. As such, the RCCs 232 may be considered to be relatively softer (i.e., have a lower axial stiffness) than the CCCs 230 because the RCCs 232 are configured such that the majority of the axial deflection goes into the elastomeric elements 232a because they are relatively thicker. In other words, the second defined distance of rebound compliance sections 232d is larger than first defined distance of compression compliance sections 230d and have a lower axial stiffness than the elastomeric elements 230a. For example, the spacer elements 230b may be axially biased apart by elastomeric element 230a a first defined distance configured to be about 0.4 inches (10.2 millimeters), whereas the spacer elements 232b may be axially biased apart by elastomeric element 232a a second defined distance configured to be about 1.2 inches (30.5 millimeters), and thus the pre-compression on the CCCs 230 is greater than the pre-compression on the RCCs 232.

The expansion and contraction of elastomeric elements 230a, 232a may occur at a non-linear rate under compressive and/or tensional axial force input. The isolator 200 may be configured to withstand axial input forces of up to about 150,000 pounds-force ($lb_f$) (about 667 kilonewtons) along the central axis 202. The isolator 200 may continue to provide at least some isolation from forces to an isolated mass 112 up until bulk loading occurs. Bulk loading occurs when axial movement of the inner member 240 with respect to the outer housing 224 is at least partially impinged due to at least one of (i) one or more elastomeric elements 230a, 232a radially expanding to the point of contact between the generally cylindrical outer profiles 230e, 232e and the outer housing 224 (ii) one or more elastomeric elements 230a, 232a radially expanding to the point of contact between inner CCC bore surface 237a and inner RCC bore surface 238a of the inner CCC bore 237 and inner RCC bore 238, respectively, and the upper tube outer surface 246 of the upper tube 245. That is, bulk loading of the CCCs 230 and RCCs 232 prevents and/or partially interrupts at least some axial reciprocation of the inner member 240 and occurs when at least some of the inner CCC bore 237 or inner RCC bore 238 and/or outer housing bore 234 is at least partially blocked by the expansion of at least one elastomeric element 230a, 232a, respectively, thereby at least partially blocking a route of fluid passage along inner CCC bores 237 and inner RCC bores 238, and/or outer housing bore 234. Due to the CCCs 230 and RCCs 232 each being pre-compressed in their neutral state, the isolator 200 can withstand axial input forces that would otherwise cause bulk loading to occur without pre-compression. For example, the isolator 200 is configured such that bulk loading of the isolator 200 may occur between about 20,000 $lb_f$ to about 150,000 $lb_f$ (about 89 kilonewtons to about 667.2 kilonewtons) of axial force applied to the isolator 200.

When the isolator 200 is fully compressed in response to compressive input forces, the CCCs 230 press against the lower shoulder 222a away from the downstream endcap 226 and the RCCs 232 are partially relieved. When the isolator 200 is fully extended in response to tension input forces, the RCCs 232 press against the upper shoulder 226a of the downstream endcap 226 in a direction away from the upstream endcap 222. In the case of a failure of the CCCs 230 and/or RCCs 232, the movable components of the isolator 200 remain connected to each other in a manner that allows removal by fishing techniques. Fishing techniques may include application of an external axial force, such that when a tensional force is exerted on the inner member 240, the elastomeric elements 232a may bulge under the increased compression until they contact the inner surface of the outer housing 224 and cause at least some bulk loading to occur, thereby allowing at least about 20,000 $lb_f$ (at least about 89 kilonewtons) of tensile loading. This may provide for axial movement along the drill string 102 and help to recover components such as isolator 200. The isolator 200 may be disassembled so as to allow one or more components thereof to be removed, inspected, and/or replaced. For example, the isolator 200 is configured so as to be disassembled so that the piston 242, one or more of the CCCs 230, and/or one or more of the RCCs 232 can be removed, inspected, and replaced as needed and/or as part of a maintenance interval.

Figure 13:
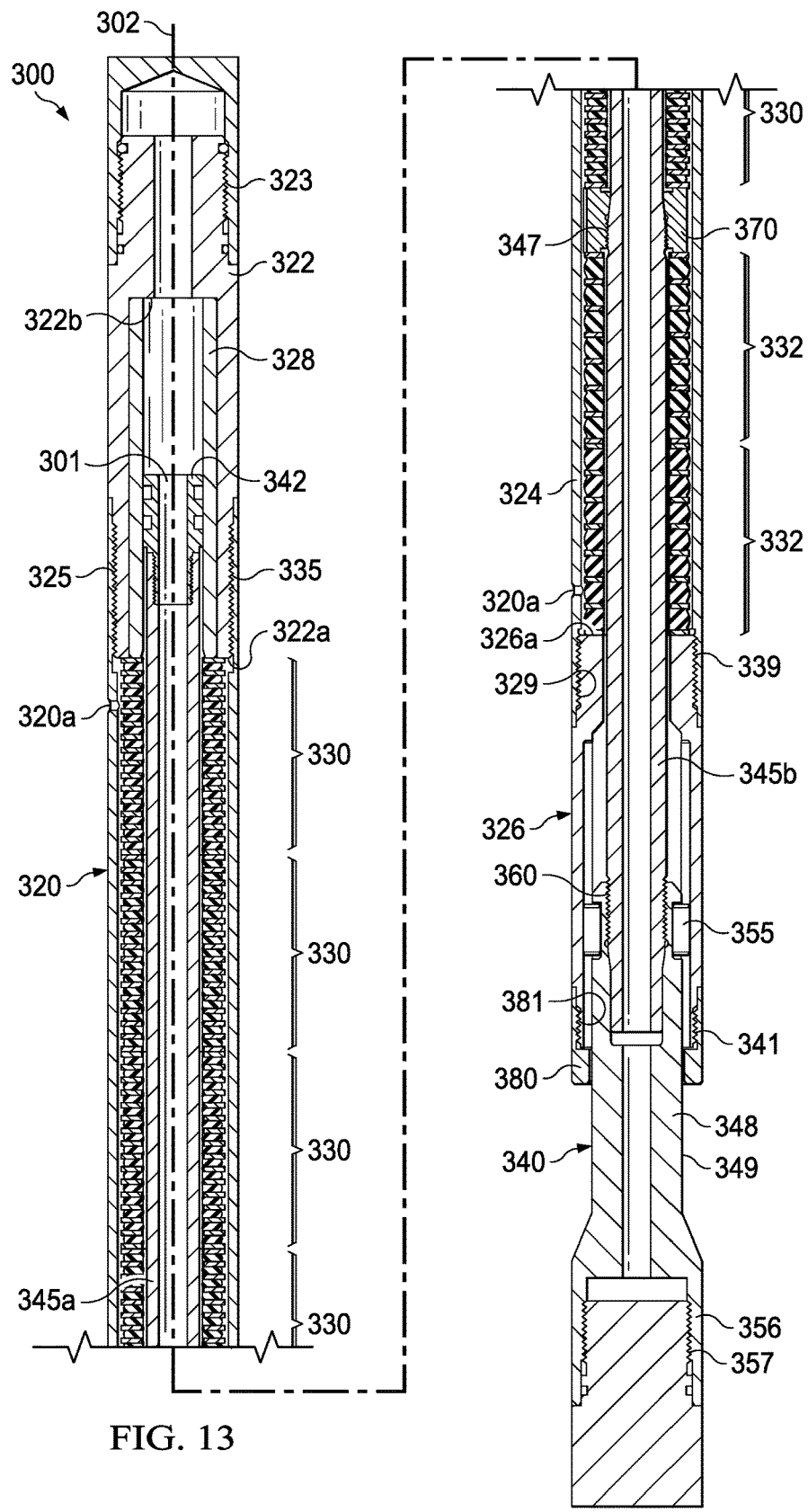
FIG. 13 is an orthogonal cross-sectional view of the isolator of FIG. 12.
Figure 14:
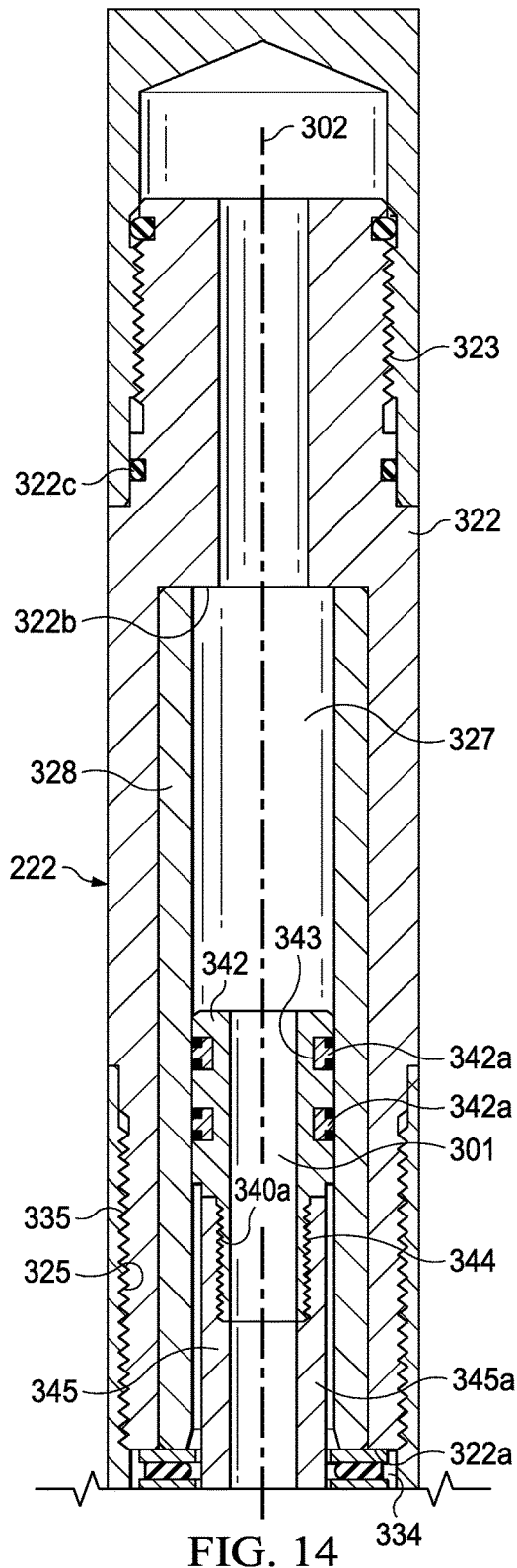
FIG. 14 is a partial orthogonal cross-sectional view of the isolator of FIG. 12 showing an upstream endcap of the isolator of FIG. 12.

Referring now to FIGS. 12 and 13, an isolator 300 is substantially similar to the isolator 200 and may be implemented in conjunction with and/or instead of the isolator 200. The isolator 300 generally defines a longitudinally-extending flowbore 301 having a central axis 302 with respect to which many of the components of the isolator 300 are substantially coaxially aligned. The isolator 300 generally includes an outer housing 324, an upstream endcap 322 connected to an upstream end of the outer housing 324, and a downstream endcap 326 connected to a downstream end of the outer housing 324. The isolator 300 further includes an inner member 340 that is received through the downstream endcap 326 and into the outer housing 324 and the upstream endcap 322. The inner member 340 is longitudinally movable relative to each of the downstream endcap 326, outer housing 324, and upstream endcap 322. As described below, the isolator 300 further includes a plurality of compression compliance components (CCCs) 330, a plurality of rebound compliance components (RCCs) 332, and a piston 342 that each contribute to the vibration isolation and shock attenuation capabilities of the isolator 300. Although FIGS. 12-14 show thread protectors 300a, 300b coupled to upper interface 323 of the upstream endcap 322 and lower interface 357 of the inner member 340, respectively, the thread protectors 300a, 300b should be removed during assembly and disposition of the isolator 300 between an isolated mass 112 and an excitation source 117. Unlike isolator 200, isolator 300 includes a pin catch 380 that connects to the downstream endcap 326 and ensures that dowel pins 355 remain captured within pin channels 354 of alignment portion 348. Further, unlike isolator 200, the alignment portion 348 of the inner member 340 is removably connected to the upper tube 345 of the inner member 340 at an alignment portion interface 360 of the upper tube 345. Further yet, the isolator 300 includes pressure compensation ports 320a through outer housing 324. Each pressure compensation port 320a defines a route of fluid communication between an exterior surface of the outer housing 324 and the outer housing bore 334. Each pressure compensation port 320a is suitable for allowing drilling fluids 124 to pass through and equalize fluid pressures within the outer housing 324 relative to fluid pressures outside of the outer housing 324. When the outer housing 324 is connected between the upstream endcap 322 and the downstream endcap 326, an outer housing bore 334 is defined that extends through the outer housing 324 between a lower shoulder 322a of the upstream endcap 322 and an upper shoulder 326a of the downstream endcap 326. The CCCs 330 and RCCs 332 are disposed within the outer housing bore 334. The inner member 340 generally carries the piston 342 at an upper end of the inner member 340. The inner member 340 generally includes the alignment portion 348 connected between the upper tube 345 and an adapter portion 356.

Figure 19:
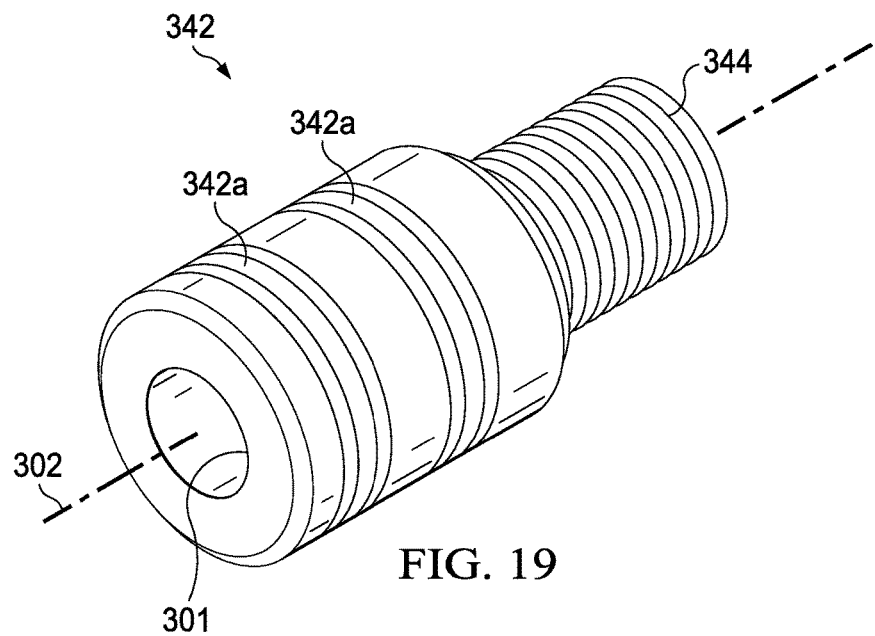
FIG. 19 is an oblique view of a piston of the isolator of FIG. 12.
Figure 20:
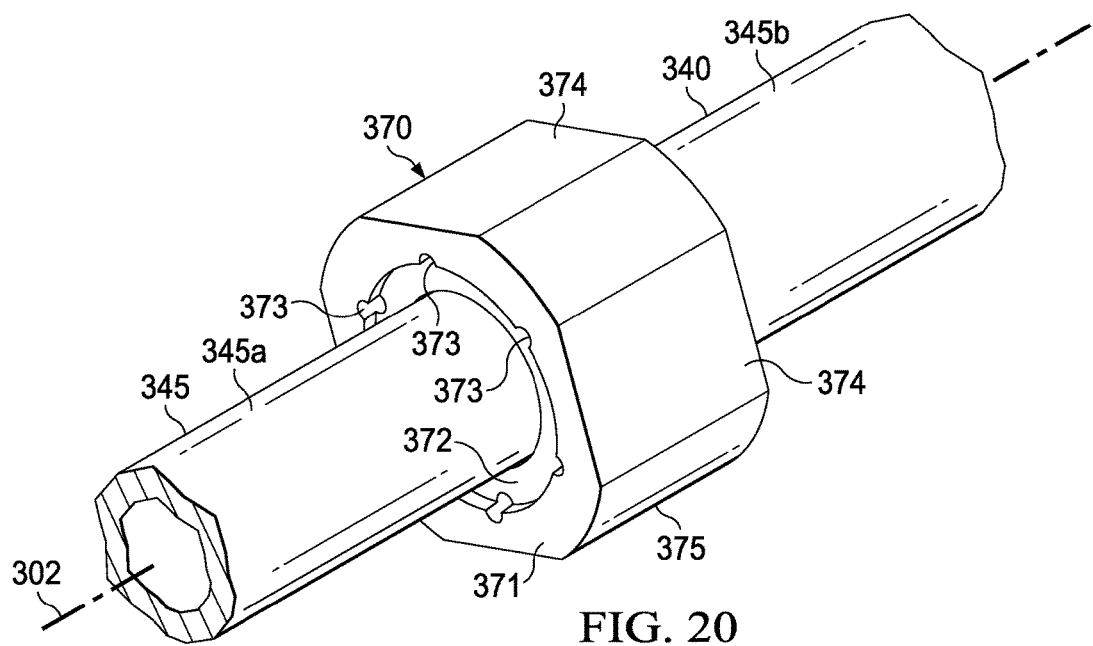
FIG. 20 is an oblique view of a portion of the inner member and the associated drive nut of the isolator of FIG. 12.

Referring to FIG. 19, the piston 342 is generally tubular and configured to be received within a sleeve bore 327 defined by the sleeve 328. The piston 342 includes two grooves 343 extending circumferentially about the outer surface of the piston 342. The grooves 343 are sized and configured to receive seals 342a. In this embodiment, the seals 342a are T-seals. In alternative embodiments, seals 342a may include O-rings, gaskets, and/or any other suitable seal shape and/or material. The piston 342 further includes an upper tube interface 344 at the lower end of the piston 342. The upper tube interface 344 includes threads complementary to threads of a piston interface 340a of the upper tube 345. The longitudinally extending flowbore 301 extends through the piston 342 and upper tube 345 when coupled together. In an alternative embodiment, the piston 342 may be welded or integrally formed with the upper tube 345. The piston 342 can reciprocate along central axis 302 within the sleeve bore 327 until the piston 342 reaches a hard end-stop 322b formed by upstream endcap 322. The CCCs 330 and RCCs 332 may be configured to withstand a shock or other axial input (e.g., a shock input, vibration, and/or other axial excitation force) and retain a separation between both the inner member 340 and a hard end-stop 322b. The CCC 330 and RCC 332 are further configured to withstand a shock input and retain a separation between both the CCCs 330 and the RCCs 332 and a hard end-stop 322b.

Figure 21:
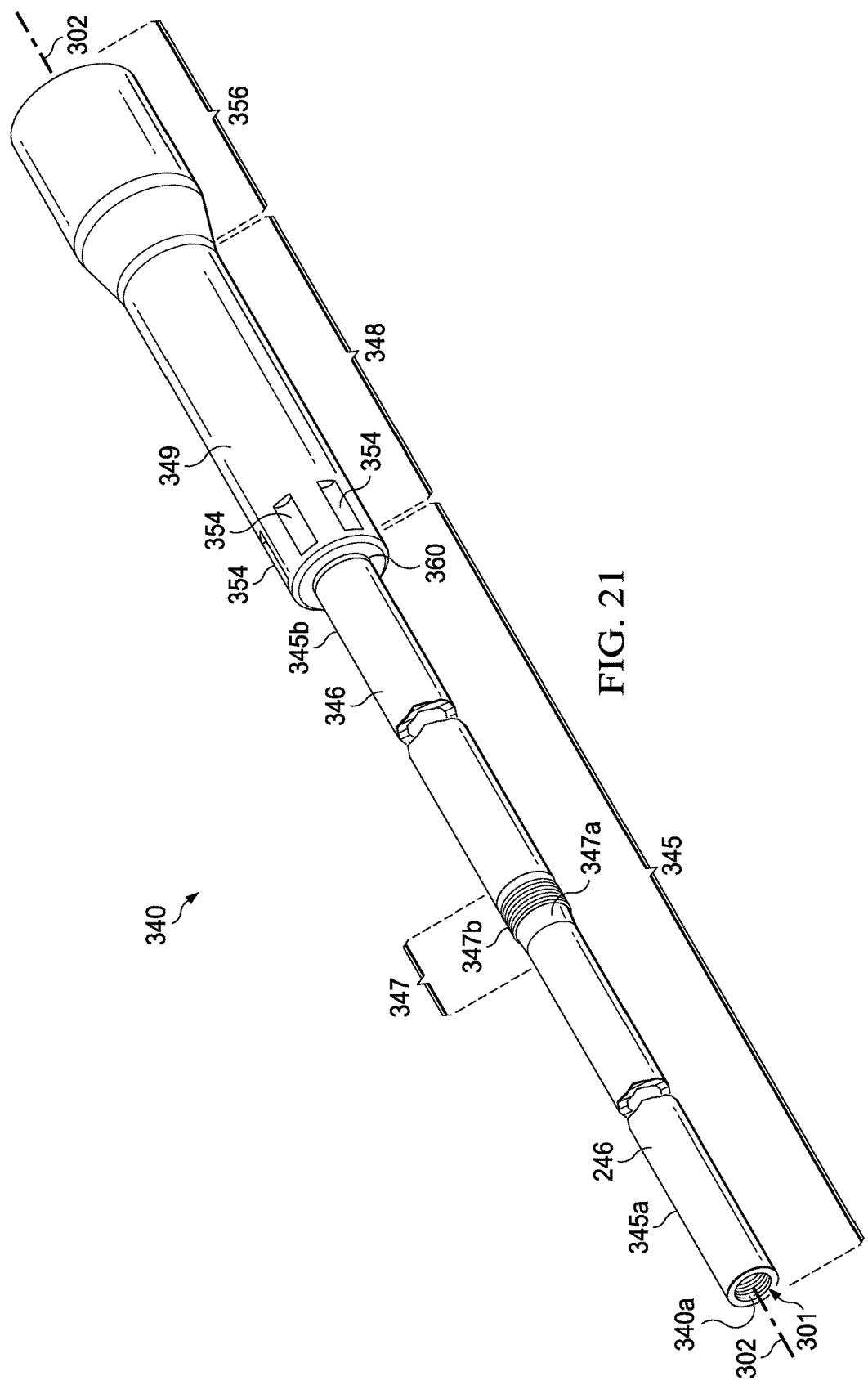
FIG. 21 is an oblique view of the inner member of the isolator of FIG. 12.

Referring to FIG. 21, the upper tube 345 generally includes an upper tube outer surface 346. The upper tube outer surface 346 is sized and configured to fit within an inner CCC bore 337 of the CCCs 330 and an inner RCC bore 338 of the RCCs 332. The upper tube 345 can include an upper section 345a that is distal from the alignment portion 348 and a lower section 345b that is adjacent to the alignment portion 348. In this embodiment, the outer diameter of upper section 345a is smaller than the outer diameter of the lower section 345b and the upper tube 345 has a generally consistent inner diameter that defines a portion of the flowbore 301. The upper tube 345 includes a drive interface 347 that joins the upper section 345a to the lower section 345b. The drive interface 347 is sized and configured to receive a drive nut 370 that extends radially beyond the drive interface 347 and allows for the transfer of axial forces between the upper tube 345 and the CCCs 330 and RCCs 332. The drive nut 370 is generally disposed between the upper section 345a and the lower section 345b.

Figure 16:
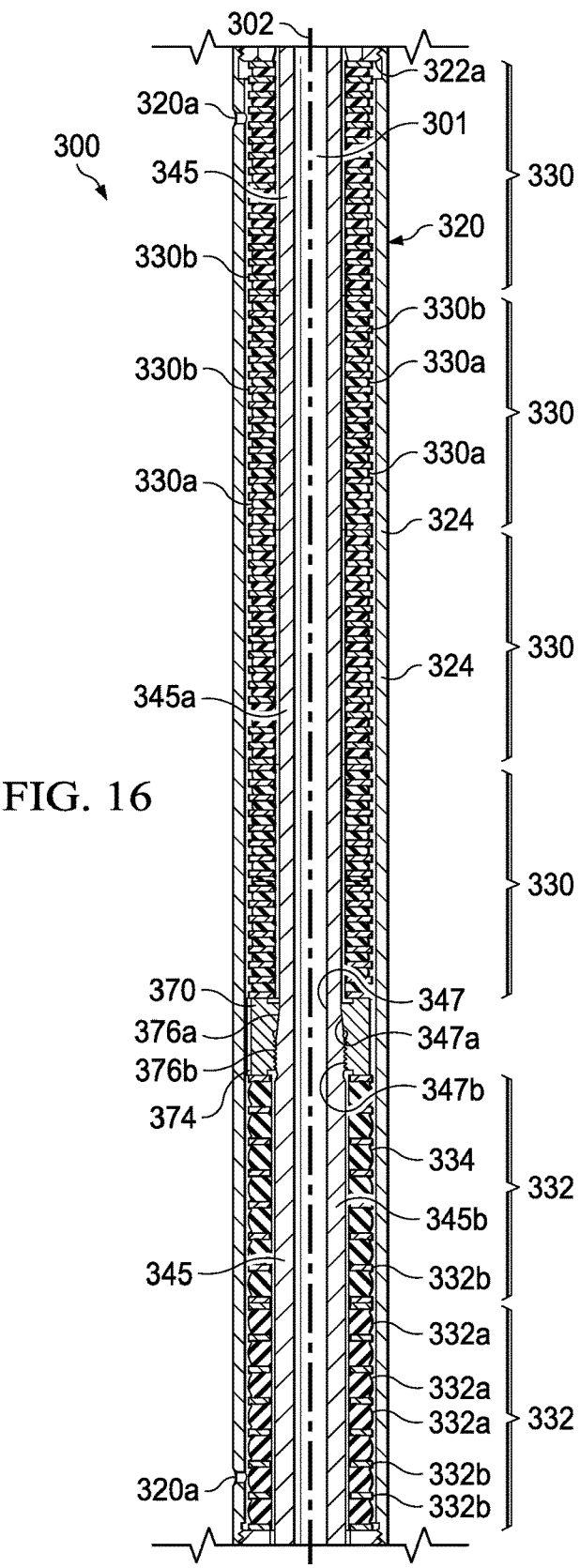
FIG. 16 is a partial orthogonal cross-sectional view of the isolator of FIG. 12.
Figure 17:
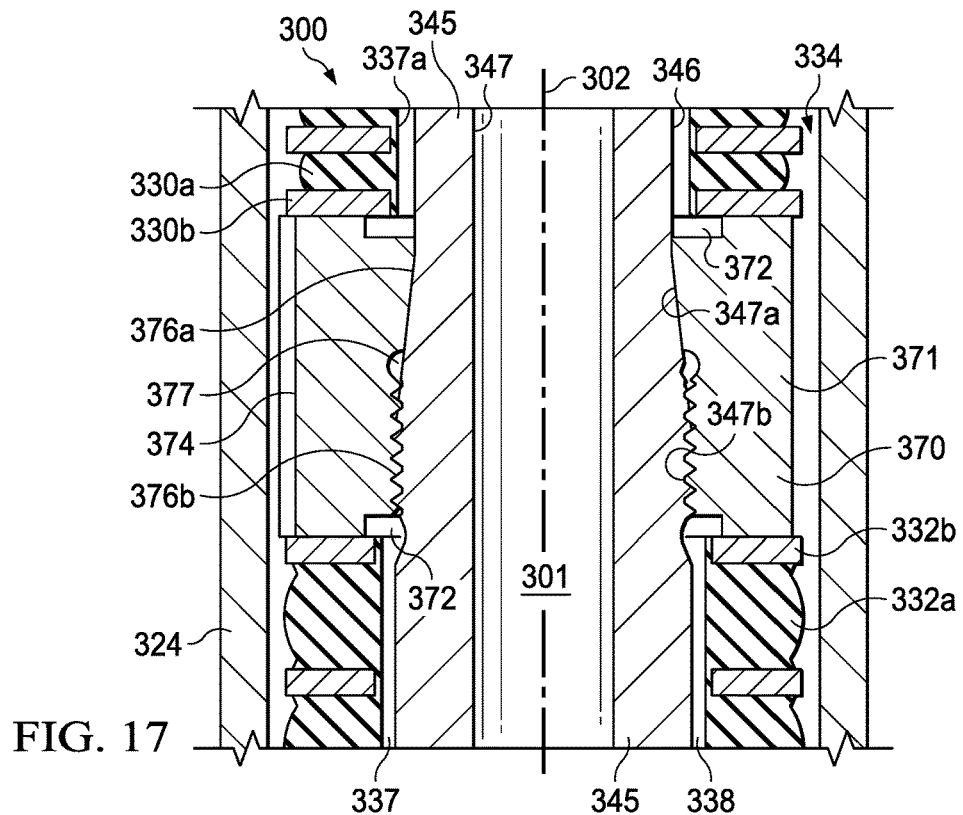
FIG. 17 is a partial orthogonal cross-sectional view of the isolator of FIG. 12 showing a drive nut of the isolator of FIG. 12.
Figure 18:
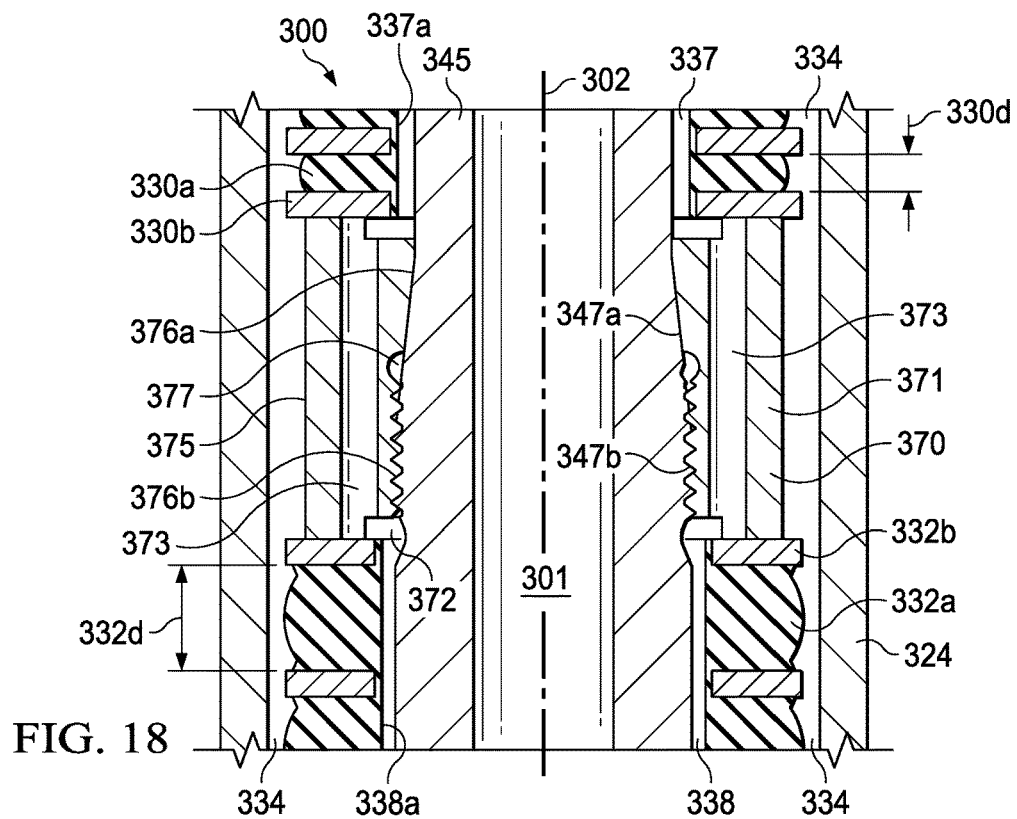
FIG. 18 is another partial orthogonal cross-sectional view of the isolator of FIG. 12 showing the drive nut of the isolator of FIG. 12.

Referring to FIGS. 16-20, the drive nut 370 has a body 371 that longitudinally extends along a central axis 302 and defines a non-uniform nut bore 376, where the nut bore 376 includes a tapered portion 376a, a non-tapered threaded surface 376b, and a notch 377 disposed therebetween. The tapered portion 376a is configured to mate with tapered portion 347a of drive interface 347, and the non-tapered threaded surface 376b couples with inner member 340 by engaging the non-tapered threaded surface 347b of drive interface 347. The drive nut 370 is configured such that when the inner member 340 is longitudinally displaced with respect to the outer housing 324 by a compressive load, the compressive load is directed to and across the tapered portion 376a and away from the non-tapered threaded surface 376b. This may allow for reduced shear loading of the non-tapered threaded surface 376b. The drive nut 370 comprises a plurality of boreholes 373 and a counter bore 372 on each end of the body 371 that extend axially towards each other part way through the body 371 (see FIGS. 17, 18, and 20). The drive nut 370 defines at least one route of fluid communication through the body 371 via at least one borehole 373 that is concentrically disposed from the central axis 302 and axially extends through the body 371 (see FIGS. 18 and 20). FIG. 17 illustrates the drive nut 370 as it is disposed in series between CCC 330 and RCC 332. FIG. 18 generally shows the same longitudinal section as FIG. 17, except with a the section taken angularly offset as compared to that of FIG. 17 to show that boreholes 373 provide at least one route of fluid communication through the drive nut 370. Each counter bore 372 at least partially bisects each of the plurality of fluid passageways such that fluid communication through the body 371 is maintained when at least one borehole 373 is partially obstructed, such as from having CCCs 330 and/or RCCs 332 axially disposed on either side and in physical contact with the body 371. The fluid passageways are configured to provide fluid communication between inner RCC bore 338 of RCC 332 and inner CCC bore 337 of CCC 330. The drive nut 370 also comprises a plurality of flat segments 374 disposed about the periphery 375 of the body 371 and longitudinally extending along the body 371 concentric with central axis 302. Each of the plurality of flat segments 374 define a route of fluid communication around the body 371 such that fluid communication is provided between the outer CCC profile 330e of the CCC 330 and the outer RCC profile 332e of the RCC 332 within the isolator 300.

Referring to FIGS. 13 and 14, assembly of isolator 300 begins with housing 320, which comprises upstream endcap 322 that generally (at least partially) defines a sleeve bore 327 that is fitted with the sleeve 328 concentrically disposed therein. In some embodiments, sleeve 328 and upstream endcap 322 may be fitted by crimping the sleeve 328. In this embodiment, the sleeve 328 is constructed of ceramic material. In alternative embodiments, sleeve 328 may have an otherwise similar sleeve formed from any suitable material or materials, for example, hardened steel, titanium, carbide, cobalt steel, or combinations thereof. Once sleeve 328 is fitted within upstream endcap 322, the sleeve bore 327 has a diameter generally sized to accept piston 342 and configured to slidably and/or moveably receive at least a part of the inner member 340, specifically allowing for reciprocative movement of piston 342 along central axis 302. The upper tube 345 of inner member 340 uses a piston interface 340a to couple with an upper tube interface 344 of piston 342 (see FIG. 19). The piston 342 is configured to provide a fluid seal within the housing 320, specifically by having one or more seals 342a disposed in grooves 343 of the piston 342 to form a fluid seal against sleeve 328. In some embodiments, seals 342a comprise T-seals. The piston 342 defines at least part of the longitudinally-extending flowbore 301 that extends along the inner member 340 and is in communication with the sleeve bore 327. The piston 342 is reciprocative along central axis 302 within the sleeve bore 327 until the piston 342 reaches a hard end-stop 322b formed by upstream endcap 322. In some embodiments, the CCCs 330 and RCCs 332 may be configured to withstand a shock or other axial input (e.g., a shock input, vibration, and/or other axial excitation force) and retain a separation between both the inner member 340 and a hard end-stop 322b. Additionally, the CCC 330 and RCC 332 may also be further configured to withstand a shock input and retain a separation between both the CCCs 330 and the RCCs 332 and a hard end-stop 322b.

Assembly of the housing 320 for isolator 300 continues with the outer housing interface 325 of upstream endcap 322 being engaged with upstream endcap interface 335 of outer housing 324, thereby coupling upstream endcap 322 and outer housing 324 together. The outer housing 324 is substantially similar to that of outer housing 224 and also has a tubular profile. The lower shoulder 322a of upstream endcap 322 bounds one end of outer housing bore 334 and the upper shoulder 326a of the downstream endcap 326 bounds the other end of outer housing bore 334. However, before downstream endcap 326 is coupled to the outer housing 324, a plurality of CCCs 330 and RCCs 332 are concentrically disposed within the outer housing bore 334 (see FIG. 16).

Figure 22:
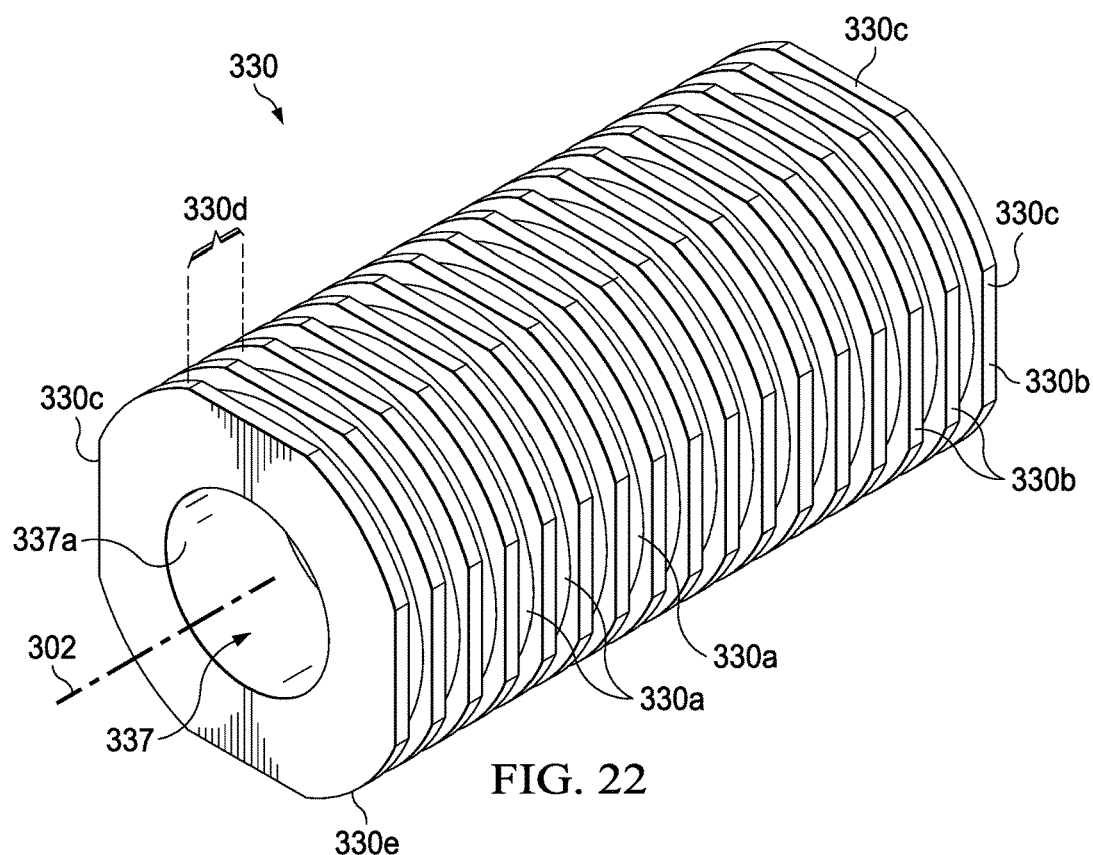
FIG. 22 is an oblique view of a CCC of the isolator of FIG. 12.

Continuing with FIG. 13 in conjunction with FIGS. 16 and 22, the isolator 300 comprises a plurality of CCCs 330 that coaxially align with central axis 302 and are axially disposed within the outer housing bore 334 in series with each other and adjacent to the lower shoulder 322a. The illustrated embodiment of isolator 300 comprises four CCCs 330 having a total of sixty-four elastomeric elements 330a; however, it is understood that alternate embodiments may comprise a different number of CCCs 330, and thus a different total number of elastomeric elements 330a. In isolator 300, each CCC 330 comprises a plurality of elastomeric elements 330a that are each compressed between a plurality of spacer elements 330b. A single elastomeric element 330a that is bonded between two spacer elements 330b (occasionally referred to as shims) forms a compression compliance section 330d, which will be discussed in detail below. The CCCs 330 of isolator 300 operate in a similar manner to the discussion for isolator 200, specifically that each of the CCCs 330 are generally configured such that, when the isolator 300 experiences a force or stress sufficient to cause the isolator 300 to be longitudinally compressed (for example, to cause the overall longitudinal length of the isolator 300 to be decreased) the compression already existing in one or more of the CCCs 330 is increased (i.e., further compressed).

Each of the elastomeric elements 330a is formed from a suitable elastomeric material, for example, rubber, nitrile, or combinations thereof. As shown in FIG. 22, CCC 330 is substantially similar to the embodiment of CCC 230 discussed above with respect to isolator 200, with certain distinctions. For example, instead of being post vulcanization bonded similar to elastomeric elements 230a in isolator 200, the elastomeric elements 330a of isolator 300 are fully bonded and transfer molded between the plurality of spacer elements 330b and are configured to form an inner CCC bore 337 having an inner CCC bore surface 337a with a continuous inner diameter. Thus, the inner CCC bore surface 337a comprises continuous elastomeric material, whereas the surface 227a of isolator 200 alternates between the material used in spacer element 230b (e.g., metal) and elastomeric element 230a (e.g., rubber and/or nitrile). Thus, the outer CCC profile 330e comprises both the spacer elements 330b and elastomeric elements 330a, whereas inner CCC bore surface 337a may consist only of elastomeric elements 330a being bonded together. The inner CCC bore 337 of CCC 330 is sized to have an inner diameter larger than the outer diameter of the upper tube 345 of the inner member 340, specifically larger than the upper section 345a of upper tube 345. The continuous inner diameter of inner CCC bore 337 has an inner CCC bore surface 337a, when concentrically disposed about the upper tube 345 of inner member 340, allows the inner CCC bore surface 337a to form a route of fluid passage between the upper tube outer surface 346 of upper tube 345 when bulk loading does not occur, thereby also allowing sliding movement along the central axis 302. The CCCs 330 may also have a generally cylindrical outer CCC profile 330e and each of the plurality of spacer elements 330b comprise one or more flat segments 330c around the outer periphery and extending along the central axis 302 for the length of the generally cylindrical outer CCC profile 330e. The one or more flat segments 330c may at least partially define and provide a route of fluid communication within the outer housing bore 334 between the lower shoulder 322a and upper shoulder 326a. In some embodiment, the CCC 330 exhibits a non-linear axial stiffness. In the embodiment of FIGS. 13 and 22, each CCC 330 includes sixteen elastomeric elements 330a and seventeen spacer elements 330b. Alternate embodiments may comprise a different number of elastomeric elements 330a and spacer elements 330b. Although the embodiment of isolator 300 comprises sixty-four compression compliance sections 330d, the total number in alternate embodiments may vary based on the amount of pre-compression, and thus axial distance, given to the elastomeric elements 330a between each spacer element 330b. The axial stiffness of the CCCs 330 are different and greater than the axial stiffness of the RCCs 332, which have a lesser axial stiffness in part because of the differing axial biases provided by the elastomeric elements 330a, 332a respectively, as discussed in further detail below.

In alternative embodiments of isolator 300, an otherwise similar CCC 330 includes any other suitable number of elastomeric elements 330a (each having a desired axial dimension and stiffness) and spacer elements 330b. In alternative embodiments, the CCCs 330 may comprise a metal spring, a wire-mesh material exhibiting suitable spring-like characteristics, or the like to provide an axial bias.

In an embodiment, the number of elastomeric elements 330a in a CCC 330 and the number of elastomeric elements 332a in a RCC 332 are selected independently. It is understood that the total number of elastomeric elements 330a axially disposed between the drive nut 370 and lower shoulder 322a is at least partially dependent on the distance therebetween and the amount of axial stiffness that the CCC 330 will provide relative to the axial stiffness that the RCC 332 will provide in order to allow for a natural frequency less than an excitation frequency associated with operation of an excitation source 117. The isolator 300 may be configured such that the amount of elastomeric elements 330a between the drive nut 370 and lower shoulder 322a is greater than the amount of elastomeric elements 332a between drive nut 370 and upper shoulder 326a because the RCCs 332 are configured to have an axial stiffness that is lower (i.e., lesser axial stiffness) relative to that of the CCCs 330 and will provide a natural frequency less than an anticipated excitation frequency (e.g., 0.7 times less than anticipated excitation frequency) when the isolator 300 is disposed between an isolated mass 112 and an excitation source 117. Similarly, the relative axial disposition of the drive nut 370 and inner member 340 within the outer housing 324 along the central axis 302 (assuming neutral state) is dependent the number of CCCs 330 and RCCs 332 disposed on either side of the drive nut 370 when coupled to the upper tube 345 of the inner member 340 and disposed within the outer housing 324.

Continuing with FIG. 13 in conjunction with FIGS. 16-18, 20, and 21, the drive nut 370 is axially disposed in series between the CCCs 330 and the RCCs 332 within the outer housing bore 334. Once the upper tube 345 of inner member 340 is disposed within housing 320, the drive nut 370 concentrically and circumferentially couples to the upper tube 345 at drive interface 347. The drive nut 370 functions similar to that of drive unit 250 of isolator 200 discussed above, however the configuration for coupling the drive nut 370 to inner member 340 is distinct. As illustrated in FIG. 21, the inner member 340 comprises the drive interface 347 axially disposed between upper section 345a and lower section 345b of upper tube 345. The drive interface 347 comprises a taper portion 347a and a non-tapered threaded surface 347b. In this embodiment, the upper tube 345 has differing outer diameters running along the upper tube outer surface 346, specifically upper section 345a having a smaller outer diameter than lower section 345b, and the drive interface 347 provides a transition between the sections via the taper portion 347a. Each of the outer diameters for upper section 345a and lower section 345b are sized to be less than the inner diameters of inner CCC bores 337 and inner RCC bores 338.

Figure 23:
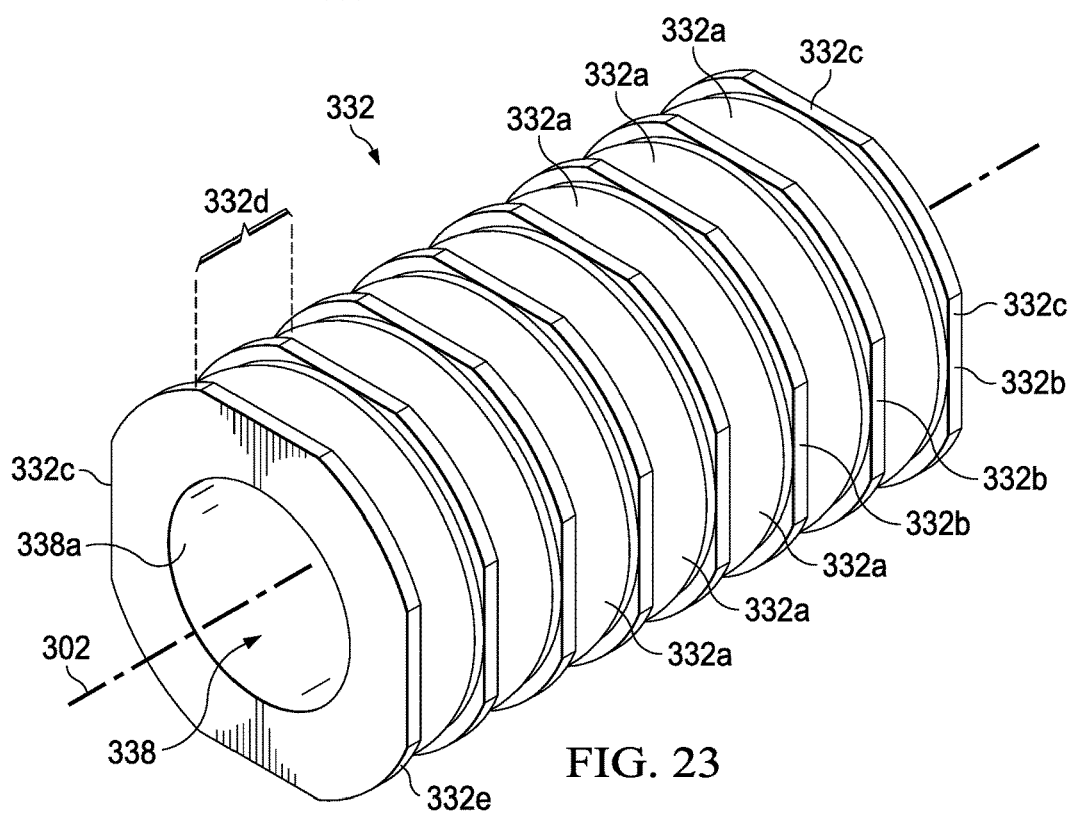
FIG. 23 is an oblique view of an RCC of the isolator of FIG. 12.

Continuing with FIG. 13, with further reference to FIG. 23, the isolator 300 also comprises a plurality of RCCs 332 that are each concentrically disposed along the upper tube 345 within the outer housing bore 334 between drive nut 370 and upper shoulder 326a. The RCCs 332 are configured to provide less axial stiffness than the axial stiffness of the CCCs 330 when the inner member 340 is moved relative to the outer housing 324 causing the inner member 340 to move in one of two axial directions along the central axis 302 (i.e., a first axial direction and second axial direction). Each of the plurality of RCCs 332 is generally configured such that, when the isolator 300 experiences a force or stress sufficient to cause the isolator 300 to be longitudinally lengthened (for example, to cause the longitudinal, axial length of the isolator 300 to be increased) the compression of one or more of the RCCs 332 is increased. The portions of RCCs 332 that are in compression can be seen in FIG. 23, which shows the RCC 332 includes a plurality of rebound compliance sections 332d. Each rebound compliance section 332d comprises an elastomeric element 332a compressed between two spacer elements 332b. Thus, the distance between the two spacer elements 332b decreases when the RCC 332 is being further compressed, and increases when the compression is relieved (i.e., when CCCs 330 are being further compressed). The RCC 332 includes a plurality of elastomeric elements 332a and a plurality of spacer elements 332b. Each of the elastomeric elements 332a is generally cylindrical in shape and includes an inner RCC bore 338 therethrough. Each of the elastomeric elements 332a is formed from a suitable elastomeric material and can be sized to have a desired dimension with respect to the central axis 302, such that each elastomeric element 332a exhibits a desired compression profile. For example, such that each elastomeric element 332a exhibits a particular lengthwise compression upon the application of a particular compressing force thereto. Spacer elements 332b and elastomeric elements 332a are alternatingly, concentrically affixed together by being fully bonded using a transfer mold to form each RCC 332. The elastomeric elements 332a comprise at least one of a rubber and a nitrile, and may be fully bonded such that the inner RCC bore surface 338a of the inner RCC bore 338 is continuous in dimension (i.e., has a generally uniform profile and circular inner diameter along the inner RCC bore 338), while the outer RCC profile 338e formed by the elastomeric elements 332a may have at least partially a curved profile compared to the generally straight profile of spacer elements 332b and inner RCC bore surface 338a. For example, FIG. 18 shows a cross-sectional view of drive nut 370 and also shows a cross-section of rebound compliance section 332d. As seen in the cross-section of rebound compliance section 332d, the elastomeric elements 332a have at least partially a curved profile within outer housing bore 334, and a substantially linear profile along central axis 302.

The elastomeric elements 332a are also pre-compressed between the spacer elements 332b prior to having a compression or tensional force being applied to the inner member 340 from an excitation source 117. The elastomeric elements 332a have an axial stiffness that is less than an axial stiffness of the elastomeric elements 330a, and are bonded such that they are pre-compressed between spacer elements 332b so as to form a parabolic profile that is wider than the parabolic profile formed by the elastomeric elements 330a between spacer elements 330b, as illustrated in FIG. 18 with respect to rebound compliance section 332d. A rebound compliance section 332d is formed by an elastomeric element 332a being fully bonded and pre-compressed between two spacer elements 332b, and the RCC 332 has a plurality of rebound compliance sections 332d. In this embodiment of isolator 300, each of the rebound compliance sections 332d are in series and each of the elastomeric elements 332a are coupled together to define the entire inner RCC bore surface 338a of the inner RCC bore 338. The inner RCC bore 338 formed by the RCC 332 and has an inner diameter that is larger than the outer diameter of the upper tube 345 such that a route of fluid passage is defined in the inner RCC bore 338 between the upper tube outer surface 346 of upper tube 345 and inner RCC bore surface 338a when bulk loading does not occur, as discussed herein. In the embodiment of FIGS. 13 and 23, each RCC 332 includes seven elastomeric elements 332a and eight spacer elements 332b. Although the embodiment of isolator 300 comprises fourteen rebound compliance sections 332d, the total number in alternate embodiments may vary based on the amount of pre-compression, and thus axial distance, given to the elastomeric elements 332a between each spacer element 332b. The RCCs 332 may also have a generally outer RCC profile 332e and each of the plurality of spacer elements 332b comprise one or more flat segments 332c around the outer periphery and extending along the central axis 302 for the length of the outer CCC profile 330e. The one or more flat segments 332c may at least partially define and provide a route of fluid communication along the length of the isolator 300 within the outer housing bore 334 between the lower shoulder 322a and upper shoulder 326a. The generally outer RCC profile 332e comprises both the spacer elements 332b and elastomeric elements 332a, whereas inner RCC bore surface 338a may consist only of elastomeric elements 332a being bonded together. In the embodiment of FIG. 23, the RCC 332 exhibits a non-linear axial stiffness, and the axial stiffness of the RCC 332 is configured to be less than that of the CCC 330.

In alternative embodiments, an otherwise similar RCC 332 includes any other suitable number of elastomeric elements 332a (each having a desired axial dimension) and spacer elements 332b. In alternative embodiments, the CCCs 330 and RCCs 332 comprise a metal spring, a wire-mesh material exhibiting suitable spring-like characteristics, or the like to provide different axial biases between the CCCs 330 and RCCs 332.

Figure 15:
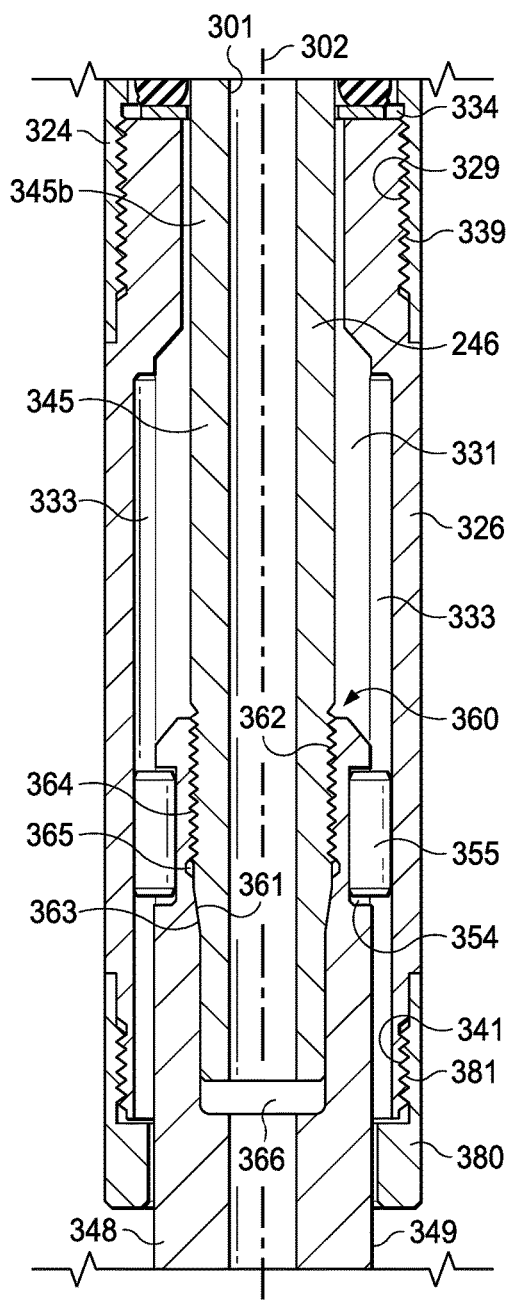
FIG. 15 is a partial orthogonal cross-sectional view of the isolator of FIG. 12 showing a downstream endcap of the isolator of FIG. 12.

Continuing with reference to FIGS. 13, 15, and 21, the isolator 300 is assembled to further include the downstream endcap 326. At the upper end of the downstream endcap 326, an outer housing interface 329 is configured to threadably engage and couple with a downstream endcap interface 339 of outer housing 324. It is understood that alternate embodiments for any of the threaded surfaces of isolator 300 may include alternate coupling means that are removable (i.e. permit removable coupling), such as quick connectors or other concentrically engaging structures. The downstream endcap 326 is a unitary structure. Alternatively, an otherwise similar downstream endcap 326 may be formed from two or more operably connected sub-components (e.g., two or more sub-components coupled by a threaded, welded, or otherwise suitable connection). The downstream endcap 326 generally (at least partially) defines a downstream endcap bore 331 that is generally sized and configured to slidably and/or movably receive at least a part of the inner member 340. The downstream endcap 326 further defines (at least partially) a plurality of axially-extending (that is, generally parallel to the central axis 302) pin channels 333 in alignment portion 348. Each of the pin channels 333 in alignment portion 348 is generally configured to receive at least a portion of a dowel pin 355, also referred to as an anti-rotation pin. For example, each of the pin channels 333 may have a substantially U-shaped cross-section, for example, a concavity having a rounded bottom beneath the surface of the downstream endcap bore 331. In alternative embodiments, otherwise similar pin channels 333 have any suitable cross-sectional shape, for example, dependent upon the shape of a dowel pin 355 for coupling engagement. Each dowel pin 355 is configured to maintain rotational (i.e., angular) of the inner member 340 relative to downstream endcap 326 about the central axis 302. Alternate embodiments of anti-rotation components (e.g., dowel pins 355) may include the use of at least one polygon spline and/or involute tooth spline circumferentially disposed about the inner member 340 to engage a complementary channel (e.g., pin channel 354) and the housing 320 so as to maintain rotation (i.e., radial) alignment between the inner member 340 and housing 320.

Prior to the dowel pins 355 being assembled within the downstream endcap 326, the upper tube 345 of inner member 340 is circumferentially coupled to the drive nut 370 and the piston 342 is coupled to the distal end of upper tube 345 such that the upper tube 345 is at least partially disposed along central axis 302 and within housing 320. When the downstream endcap 326 is coupled to outer housing 324 and the drive nut 370 is circumferentially coupled to inner member 340 at drive interface 347, each of the CCCs 330 and RCCs 332 are positioned within the outer housing bore 334. In particular, each of the CCCs 330 and RCCs 332 are concentrically positioned in series within the outer housing bore 334 that is bounded between the lower shoulder 322a of the upstream endcap 322 and the upper shoulder 326a of the downstream endcap 326. In this configuration, each of the CCCs 330 and RCCs 332 are compressed (i.e., in pre-compression) when no longitudinal (i.e., axial) compression forces and when no tensional forces are being applied to the inner member 340 relative to the housing 320.

As illustrated in FIG. 15, the embodiment of inner member 340 in isolator 300 is made up from multiple components instead of being a unitary structure similar to the embodiment of inner member 240 having upper tube 245 and alignment portion 248 of isolator 200 being unitary. In this embodiment of isolator 300, the inner member 340 comprises upper tube 345 that removably couples to alignment portion 348 at alignment portion interface 360. The alignment portion 348 comprises a non-uniform axial bore 366 that is configured to receive upper tube 345 so as to couple together with upper tube 345 and create a force path through the alignment portion interface 360 when a compressional and/or tensional force is axially received to the isolator 300. The upper tube 345 comprises a non-tapered threaded surface 362 that engages with non-tapered surface 364 of the alignment portion 348. The upper tube 345 also comprises a tapered portion 361 that mates with tapered portion 363 of alignment portion 348. In addition to the tapered portion 363 and non-tapered threaded surface 364, the alignment portion 348 further comprises a notch 365 that is disposed between the tapered portion 363 and non-tapered threaded surface 364. The alignment portion interface 360 is configured to be substantially similar to that of drive interface 347 such that any compressive load through the isolator 300 will be applied to the tapered portions 361, 363, 347a, 376a and away from the non-tapered threaded surfaces 362, 364, 347b, 376b, thereby lowering the shear loading directly on the threads of each of the alignment portion 348, upper tube 345, and drive nut 370. The drive interface 347 and alignment portion interface 360 may be considered embodiments of an isolator connection segment, which facilitates the isolation of an axial excitation force while minimizing shear forces on the threaded surfaces. As such, one embodiment of a body of the isolator connection segment may be the alignment portion 348 having a non-uniform axial bore 366, and another embodiment may be considered the body 371 of drive nut 370 having a non-uniform nut bore 376.

With the lower section 345b of the upper tube 345 coupled to the alignment portion 348 via the alignment portion interface 360, the anti-rotation pin (i.e., dowel pins 355) can be put in place as part of the inner member 340. When assembled, the inner member 340 may comprise upper tube 345, alignment portion 348, drive nut 370, and piston 342. The inner member 340 defines the longitudinally-extending flowbore 301 that is an annulus running the length of the inner member 340 and provides fluid communication therein, thereby providing fluid damping based on changes in volume within the sleeve bore 327 and axial forces placed upon the inner member 340. It is understood that the assembled inner member 340, CCCs 330, and RCCs 332 may be implemented in isolator 200 and achieve substantially similar operation. The pin catch 380 and downstream endcap 326 are removably coupled together via the pin catch interface 341 of downstream endcap 326 removably engaging with the downstream endcap interface 381 of pin catch 380. The pin catch 380 is configured have a generally cylindrical hollow profile that has an opening with an inner diameter that is sized to be larger than the outer diameter of alignment portion 348 such that fluid communication is permitted between the outer surface 349 of alignment portion 348 and the downstream endcap bore 331. The pin catch 380 is configured to maintain disposition of the dowel pins 355 within the downstream endcap 326. In some embodiments, when the downstream endcap 326 has the inner member 340 disposed through the downstream endcap bore 331, the pin channels 354 of the alignment portion 348 are fitted with the dowel pins 355, and the pin catch 380 is coupled to the downstream endcap 326, the composition of components may form an anti-rotation assemblage. The alignment portion 348 also comprises an adapter portion 356 having a threaded surface 357 that allows for removable coupling to another component, such as a component in a drill string 102, for example a pulser helix 111.

The isolator 300 may be disassembled so as to allow one or more components thereof to be removed, inspected, and/or replaced. For example, in the embodiment of FIG. 13, the isolator 300 is configured so as to be disassembled so that any of the piston 342, one or more of the CCCs 330, one of more of the RCCs 332, drive nut 370, upper tube 345, alignment portion 348, sleeve 328, and/or dowel pins 355 can be removed, inspected, and replaced as needed and/or as part of a planned maintenance interval.

As shown in the embodiment of FIG. 13, each of the four CCCs 330 of isolator 300 is concentrically disposed about a portion (i.e., upper section 345a) of the upper tube outer surface 346 of the upper tube 345 and longitudinally disposed (i.e., axially disposed) between the drive nut 370 and the lower shoulder 322a of the upstream endcap 322. Also, each of the two RCCs 332 is disposed about another portion (i.e., lower section 345b) of the upper tube outer surface 346 of the upper tube 345 and longitudinally between the drive nut 370 and the upper shoulder 326a of the downstream endcap 326. When the isolator 300 is in a neutral state (e.g., when no outside longitudinal tensional force and no outside longitudinal compression force is applied to the isolator 300), at least one of the four CCCs 330 is at least partially compressed within the housing 320 and at least one of the two RCCs 332 is at least partially compressed within the housing 320. The degree to which the one or more of the CCCs 330 and one or more of the RCCs 332 are compressed (when the isolator 300 is in the neutral state) is adjustable and dependent upon a distance between the lower shoulder 322a of the upstream endcap 322 and the upper shoulder 326a of the downstream endcap 326. For example, by adjusting the threaded connection between the upstream endcap 322 and the outer housing 324, by adjusting the threaded connections between the outer housing 324 and the downstream endcap 326, and/or adjusting the threaded connection at the drive interface 347.

In operation, the isolator 300 when coupled with an isolated mass 112 that is to be isolated provides a relatively soft (relatively long settling time) spring mass system that operates to isolate the isolated mass 112 from selected frequencies of vibrational perturbations along the central axis 302. For example, so as to attenuate a shock, damp a vibration, isolate a vibration, and any combination thereof. While in some embodiments, the isolated mass 112 may weigh about 150 pounds (about 68 kilograms), in alternative embodiments, the isolated mass 112 and/or any other components that together include a mass to be isolated by the isolator 300 may weigh any other suitable amount. Examples of an isolated mass 112 include electronic components that may comprise measuring while drilling (MWD) and/or logging while drilling (LWD) devices.

For example, in an alternate embodiment of HRS 100 that uses isolator 300, the isolator 300 receives perturbing axial input forces (e.g. axial excitation compressive forces and/or tension forces) from the mule shoe 110 and transfers the forces between the inner member 340 and the housing 320 via the drive nut 370 and the CCCs 330 and/or the RCCs 332. A compressional force (e.g., a force effective to compress the isolator 300 longitudinally and decreases the overall length of the isolator 300) is transferred via the adapter portion 356 to the alignment portion 348, through the alignment portion interface 360 to upper tube 345; the upper tube 345 transfers the compressional force to the CCCs 330 via the drive nut 370, thereby causing an increase in the compression of the CCCs 330 (e.g., causing the CCCs 330 to be further compressed between the drive nut 370 and the lower shoulder 322a of the upstream endcap 322, that is, compressed to a degree greater than the degree to which the CCCs 330 were compressed when the isolator 300 was in the neutral state) and allowing a partial precompression release of the RCCs 332 (i.e., compression to a lesser degree than in the neutral state). In this embodiment, when the inner member 340 is compressed with respect to the housing 320, the inner member 340 is considered to be moving in a first direction axially along central axis 302. Conversely, when the inner member 340 is in tension with respect to the housing 320, the inner member 340 is considered to be moving in a second direction axially along central axis 302. The axial input forces (whether compressive forces and/or tension forces) are received from an excitation source 117, such as drill bit 106 and/or an axial excitation tool 119 that causes axial input forces.

Conversely, a tensional force (e.g., a force effective to extend the isolator 300 longitudinally) is transferred via the adapter portion 356 to the alignment portion 348, through the alignment portion interface 360 to the upper tube 345; the upper tube 345 transfers the tensional force to the RCCs 332 via the drive nut 370, thereby causing an increase in the compression of the RCCs 332 (e.g., causing the RCCs 332 to be further compressed between the drive nut 370 and the upper shoulder 326a of the downstream endcap 326, that is, compressed to a degree greater than the degree to which the RCCs 332 were compressed when the isolator 300 was in the neutral state) and allowing a partial precompression release of the CCCs 330 (i.e., compression to a lesser degree than in the neutral state). As used in this embodiment, the term neutral state refers to a relative position of the inner member 340 with respect to the housing 320 where the inner member 340 is not moving in the first direction or second direction along central axis 302 (i.e., the inner member 340 is not longitudinally compressed or tensioned) due to an external axial input force (i.e., from an excitation source 117). In this neutral state, the isolator 300 is considered to be in dual-compression because each of the CCCs 330 and the RCCs 332 are in pre-compression on either side of the drive nut 370 upon assembly. The elastomeric elements 330a, 332a each provide a different axial bias (and thus different axial stiffness) between spacer elements 330b, 332b respectively when no axial input forces from an excitation source 117 are being applied to the inner member 340.

As shown in FIGS. 13, 16-18, 22, and 23, the CCC 330 has a plurality of compression compliance sections 330d (see FIG. 22), each section comprising an elastomeric element 330a compressed (i.e., considered to be pre-compressed in the neutral state) between two spacer elements 330b, thereby providing axial bias and a first axial stiffness over a first defined distance between the two spacer elements 330b. Similarly, the RCC 332 has a plurality of rebound compliance sections 332d (see FIG. 23) each section comprising an elastomeric element 332a compressed (i.e., pre-compressed in neutral state) between two spacer elements 332b, thereby providing a second axial bias and a second axial stiffness over a second defined distance. The second defined distance between spacer elements 332b of rebound compliance section 332d is greater than the first defined distance between spacer elements 330b of compression compliance section 330d, thereby contributing to the CCC 330 having a greater axial stiffness than the RCC 332. Thus, when the inner member 340 receives a compressive force (i.e., when inner member 340 is longitudinally compressed with respect to the housing 320), the first defined distance of the compression compliance sections 330d decreases due to the elastomeric elements 330a radially expanding (i.e., further compressed), and the second defined distance of the rebound compliance sections 332d increases due to the elastomeric elements 332a radially contracting (i.e., partial precompression release of the RCCs 332). Conversely, when the inner member 340 receives a tensional force (e.g., when inner member 340 is longitudinally tensioned with respect to the housing 320), the second defined distance of the rebound compliance sections 332d decreases due to the elastomeric elements 332a radially expanding (i.e., further compressed), and the first defined distance of the compression compliance sections 330d increasing due to the elastomeric elements 330a radially contracting (i.e., partial precompression release of the CCCs 330). As such, the RCCs 332 may be considered to be relatively softer (i.e., have a lesser axial stiffness) than the CCCs 330 because the RCCs 332 are configured such that the majority of the axial deflection goes into the elastomeric elements 332a because they are relatively thicker (i.e., the second defined distance of rebound compliance sections 332d is larger than first defined distance of compression compliance sections 330d) and have a lower axial stiffness (i.e., lower axial bias) than the elastomeric elements 330a. Thus, the CCC 330 has first axial stiffness, and the RCC 332 has a second lesser axial stiffness (i.e., the axial stiffness of the RCC 332 is less than the axial stiffness of the CCC 330). For example, the spacer elements 330b may be axially biased apart by elastomeric element 330a a first defined distance configured to be about 0.4 inches (10.2 millimeters), whereas the spacer elements 332b may be axially biased apart by elastomeric element 332a a second defined distance configured to be about 1.2 inches (30.5 millimeters), and thus the pre-compression on the CCCs 330 is greater than the pre-compression on the RCCs 332. The CCC and the RCC are further configured such that under large compressive and tensile motions along the central axis, the CCC and RCC maintain contact throughout the entire isolator. This occurs between the upstream end cap and CCC, CCC and drive washer, drive washer and RCC, and RCC and downstream end cap.

The expansion and contraction of elastomeric elements 330a, 332a may occur at a non-linear rate under compressive and/or tensional axial force input. The isolator 300 may be configured to withstand axial input forces of up to about 150,000 $lb_f$ (about 667 kilonewtons) along the central axis 302. The isolator 300 may continue to provide at least some isolation from forces to an isolated mass 112 up until bulk loading occurs. Bulk loading occurs when axial movement of the inner member 340 with respect to the housing 320 is at least partially impinged due to at least one of (i) one or more elastomeric elements 330a, 332a radially expanding to the point of contact between the outer CCC profiles 330e and/or outer RCC profiles 332e and the outer housing 324 or (ii) one or more elastomeric elements 330a, 332a radially expanding to the point of contact between inner CCC bore surface 337a and/or inner RCC bore surface 338a and the upper tube outer surface 346 of the upper tube 345. Bulk loading of the CCCs 330 and RCCs 332 prevents and/or partially interrupts at least some axial reciprocation of the inner member 340 and occurs when at least some of the inner CCC bore 337 and/or inner RCC bore 338 and/or outer housing bore 334 is at least partially blocked by the expansion of at least one elastomeric element 330a, 332a, respectively, thereby at least partially blocking a route of fluid passage along inner CCC bores 337, inner RCC bore 338, and/or outer housing bore 334. Due to the CCCs 330 and RCCs 332 each being pre-compressed in their neutral state, the isolator 300 can withstand axial input forces that would otherwise cause bulk loading to occur without pre-compression. For example, the isolator 300 is configured such that bulk loading of the isolator 300 may occur between about 20,000 $lb_f$ to about 150,000 $lb_f$ (about 89 kilonewtons to about 667.2 kilonewtons) of axial force applied to the isolator 300.

When the isolator 300 is fully compressed in response to compressive input forces, the CCCs 330 press against the lower shoulder 322a away from the downstream endcap 326 and the RCCs 332 are partially relieved. When the isolator 300 is fully extended in response to tension input forces, the RCCs 332 press against the upper shoulder 326a of the downstream endcap 326 in a direction away from the upstream endcap 322. Accordingly, in the case of a failure of the CCCs 330 and/or RCCs 332, the movable components (e.g., the inner member 340 with the drive unit 350 and housing 320) of the isolator 300 do not separate from each other, but rather, remain connected to each other in a manner that allow removal by fishing techniques. Fishing techniques may include application of an external (i.e., outside the isolator 300) axial force, such that when a tensional force is exerted on the inner member 340 with respect to the housing 320, the elastomeric elements 332a may bulge under the increased compression until they contact the inner surface of the outer housing 324 and cause at least some bulk loading to occur, thereby allowing at least about 20,000 $lb_f$ (at least about 89 kilonewtons) of tensile loading. This may provide for axial movement along the drill string 102 and help to recover components, such as isolator 300.

The present disclosure also includes embodiments of a method for isolating a component (e.g., an isolated mass 112). In a disclosed embodiment, the method comprises selecting an excitation frequency associated with operation of an excitation source 117. As previously disclosed herein, embodiments of an excitation source 117 may include at least one of an axial excitation tool 119 and a drill bit 106. The method may further comprise providing a system comprising an isolated mass 112 and an isolator 200 and/or isolator 300. Embodiments of an isolated mass 112 may include a component of a system that may be damaged and/or not perform as intended when subjected to axial forces. For example, an isolated mass 112 may include electronic components such as at least one of a measurement while drilling (MWD) component and/or a log while drilling (LWD) component. The isolator 300 may be configured to comprise a natural frequency less than the selected excitation frequency. For example, the excitation frequency (i.e., selected excitation frequency) may be equal to a value of between about 10 Hz to 25 Hz. In another embodiment, the excitation frequency is equal to a value of between about 25 Hz to 100 Hz. Some embodiments of a HRS 100 may include any isolator 200 and/or isolator 300 disclosed herein. The method may further include any of disposing the isolator 200 and/or isolator 300 between the isolated mass 112 and the excitation source 117, attenuating a shock to the isolated mass 112 via the isolator 200 and/or isolator 300, damping a vibration to the isolated mass 112 via the isolator 200 and/or isolator 300, and isolating the isolated mass 112 from a vibration via the isolator 200 and/or 300. A natural frequency of the isolator 200 and/or isolator 300 and/or combinations thereof is less than a vibratory frequency generated by the excitation source 117 such that the transmissibility at the excitation frequency is less than 1.0.

According to alternative embodiment of the disclosure, the HRS 100 may comprise two or more isolators 200 and/or isolators 300 connected to each other in series along the drill string 102. In some embodiments, one or more of the isolator 200 components and/or the isolator 300 components may comprise metal, such as, but not limited to, stainless steel.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:
1. An isolator, comprising:
    an outer housing comprising an outer housing bore;
    an inner member received coaxially within the outer housing;
    a precompressed compression compliance component (CCC) disposed between the outer housing and the inner member, the precompressed CCC being configured to longitudinally bias the inner member in an axial direction; and
    a precompressed rebound compliance component (RCC) disposed between the outer housing and the inner member, the precompressed RCC being configured to longitudinally bias the inner member in an opposite axial direction.
2. The isolator of claim 1, wherein movement of the inner member in the axial direction reduces a compression of the precompressed CCC and increases a compression of the precompressed RCC and wherein movement of the inner member in the opposite axial direction increases a compres- sion of the precompressed CCC and decreases a compression of the precompressed RCC.

3. The isolator of claim 1, wherein at least one of (1) the precompressed CCC is configured to allow fluid to pass between the precompressed CCC and the outer housing and (2) the precompressed RCC is configured to allow a fluid to pass between the precompressed RCC and the outer housing.

4. The isolator of claim 1, further comprising:
   an upstream endcap attached to an upstream endcap interface of the outer housing; and
   a ceramic sleeve disposed within the upstream endcap.

5. The isolator of claim 4, further comprising a piston carried by the inner member, the piston being movably received within the ceramic sleeve.

6. The isolator of claim 1, the outer member comprising a pressure compensation port.

7. The isolator of claim 1, further comprising at least one of a drive unit and a drive nut carried by the inner member and disposed between the precompressed CCC and the precompressed RCC.

8. The isolator of claim 1, wherein the precompressed CCC comprises an axial stiffness higher than an axial stiffness of the precompressed RCC.

9. The isolator of claim 1, wherein at least one of the precompressed CCC and the precompressed RCC comprise a non-linear axial stiffness.

10. A hydrocarbon recovery system (HRS), comprising:
    an isolated mass;
    an excitation source; and
    an isolator disposed between the isolated mass and the excitation source, the isolator comprising:
      an outer housing comprising an outer housing bore;
      an inner member received coaxially within the outer housing;
      a precompressed compression compliance component (CCC) disposed between the outer housing and the inner member, the precompressed CCC being configured to longitudinally bias the inner member in an axial direction; and
      a precompressed rebound compliance component (RCC) disposed between the outer housing and the inner member, the precompressed RCC being configured to longitudinally bias the inner member in an opposite axial direction.

11. The HRS of claim 10, wherein the excitation source is a drill bit.

12. The HRS of claim 10, wherein movement of the inner member in the axial direction reduces a compression of the precompressed CCC and increases a compression of the precompressed RCC and wherein movement of the inner member in the opposite axial direction increases a compression of the precompressed CCC and decreases a compression of the precompressed RCC.

13. The HRS (100) of claim 10, wherein at least one of (1) the precompressed CCC is configured to allow fluid to pass between the precompressed CCC and the outer housing and (2) the precompressed RCC is configured to allow a fluid to pass between the precompressed RCC and the outer housing.

14. The HRS of claim 10, wherein the isolator further comprises:
    an upstream endcap attached to an upstream endcap interface of the outer housing; and
    a ceramic sleeve disposed within the upstream endcap.

15. The HRS of claim 14, further comprising a piston carried by the inner member, the piston being movably received within the ceramic sleeve.

16. The HRS of claim 10, the outer member comprising a pressure compensation port.

17. The HRS of claim 10, wherein the isolator further comprises at least one of a drive unit and a drive nut carried by the inner member and disposed between the precompressed CCC and the precompressed RCC.

18. The HRS of claim 10, wherein the precompressed CCC comprises an axial stiffness higher than an axial stiffness of the precompressed RCC.

19. The HRS of claim 10, wherein at least one of the precompressed CCC and the precompressed RCC comprise a non-linear axial stiffness.

20. The HRS of claim 10, wherein the isolator is configured to at least one of attenuate transmission of a shock from the excitation source to the isolated mass, damp a vibration from the excitation source to the isolated mass, and isolate the isolated mass from a vibration emanating from the excitation source.

21. The HRS of claim 20, wherein the at least one of the shock from the excitation source and the vibration from the excitation source occur at an excitation frequency selected from the group of frequency ranges consisting of about 10 Hz to about 25 Hz and about 25 Hz to about 100 Hz.

22. An isolator, comprising:
    an outer housing comprising an outer housing bore;
    an inner member received coaxially within the outer housing;
    a precompressed compression compliance component (CCC) disposed between the outer housing and the inner member, the precompressed CCC being configured to longitudinally bias the inner member in an axial direction;
    a precompressed rebound compliance component (RCC) disposed between the outer housing and the inner member, the precompressed RCC being configured to longitudinally bias the inner member in an opposite axial direction;
    an upstream endcap attached to an upstream endcap interface of the outer housing;
    a ceramic sleeve disposed within the upstream endcap; and
    a piston carried by the inner member, the piston being movably received within the ceramic sleeve.

* * * * *